(12) United States Patent
Doi et al.

(10) Patent No.: US 6,594,407 B2
(45) Date of Patent: Jul. 15, 2003

(54) OPTICAL MODULATOR OF CLOCK MODULATION TYPE

(75) Inventors: Masaharu Doi, Kawasaki (JP); Tetsuo Ishizaka, Kawasaki (JP); Takehito Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 64 days.

(21) Appl. No.: 09/799,120

(22) Filed: Mar. 6, 2001

(65) Prior Publication Data

US 2003/0007710 A1 Jan. 9, 2003

(51) Int. Cl.$^7$ .............................. G02F 1/01; H04B 10/04
(52) U.S. Cl. .................. 385/2; 385/1; 385/3; 359/180; 359/245; 359/187; 359/279
(58) Field of Search .................... 385/2, 3, 1; 359/180, 359/181, 187, 237, 245, 278, 279, 286, 287, 239

(56) References Cited

U.S. PATENT DOCUMENTS

| | | | | |
|---|---|---|---|---|
| 6,384,954 B1 | * | 5/2002 | Webb | 359/245 |
| 6,407,845 B2 | * | 6/2002 | Nakamoto | 359/239 |
| 2002/0054421 A1 | * | 5/2002 | Bissessur | 359/276 |
| 2002/0109893 A1 | * | 8/2002 | Givehchi | 359/181 |

OTHER PUBLICATIONS

Kulick, John, "Road to 40 Gbit/sec lightwave systems," Lightwave Magazine, Penn Well Corporation, Mar. 2001 issue (Mar. 18, 2001).

Doi, M., et al., "Clock Modulator Integrated LiNbO$_3$ RZ Modulator," Proceedings of the 2000 IEICE General Conference, Mar. 28–31, 2000, IEICE, C–3–23, p. 202. with English translation.

Doi, M., et al., "40 Gb/s LiNbO$_3$ Modulator," Technical Report of IEICE, vol. 100, No. 234, pp. 44–48, with English translation of relevant pages.

Johnson, D., et al., Agere Systems, Industrial Research Highlights, IEEE LEOS Newsletter, Aug. 2001, pp. 3–7.

Hallemeier, P., et al., "Next Generation 10Gb/s Lithium Niobate Modulator Components for RZ Based Transmission Techniques," National Fiber Optic Engineers Conference (NFOEC) Technical Proceedings, Sep., 1999, pp. 175–180.

* cited by examiner

Primary Examiner—Hemang Sanghavi
(74) Attorney, Agent, or Firm—Staas & Halsey LLP

(57) ABSTRACT

A first optical waveguide, a second optical waveguide, a first electrode, and a second electrode are integrated on a substrate. An optical modulator is provided with a clock signal generator for generating an RZ signal by applying a clock signal to either the first or second electrode, and an NRZ data signal generator for supplying an NRZ data signal to the remaining electrode. Thus, the space required by the optical modulator is reduced while tolerance of the same is improved, thus reducing costs for constructing the optical modulator.

24 Claims, 22 Drawing Sheets

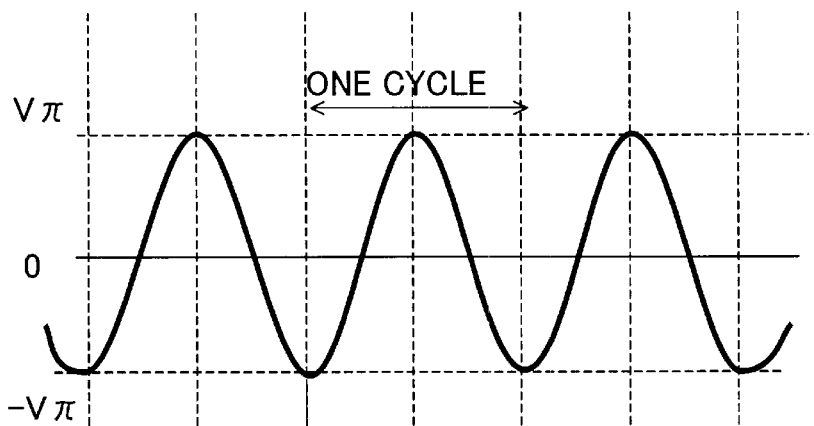
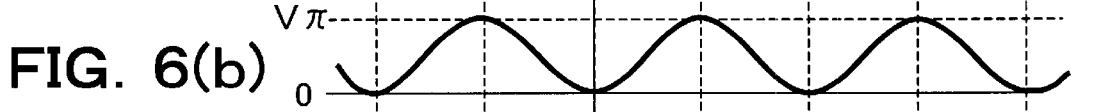
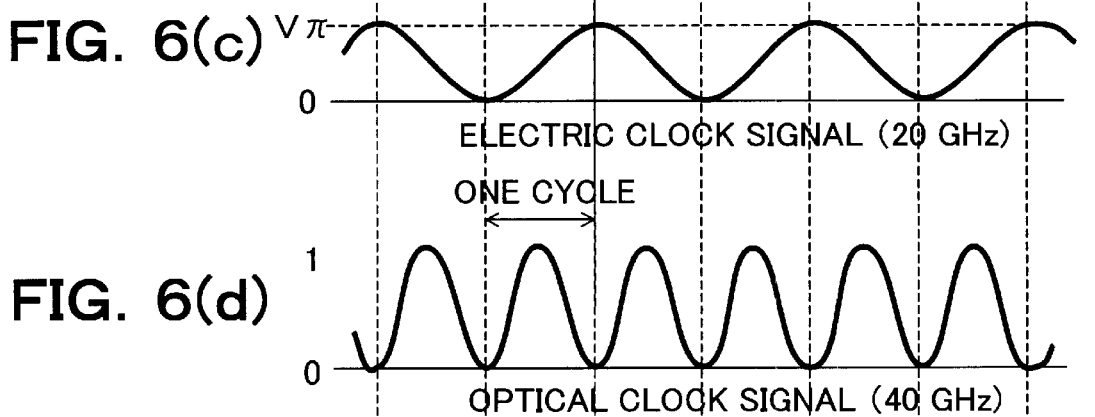
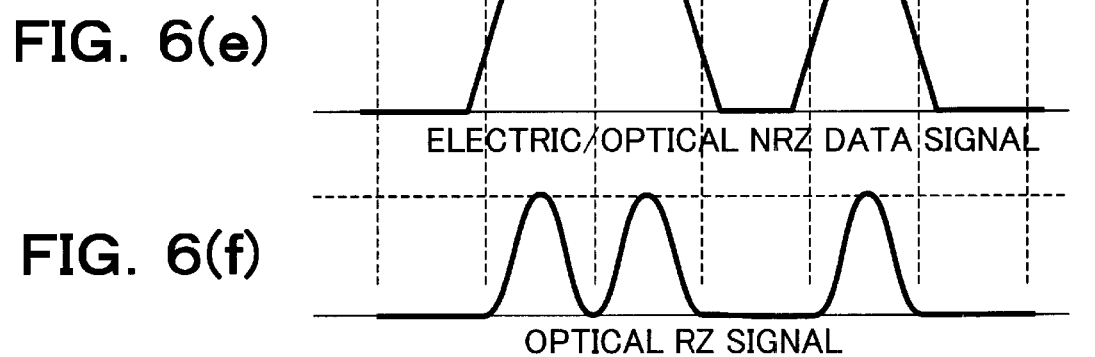
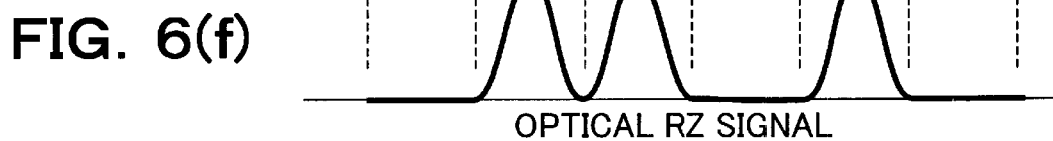

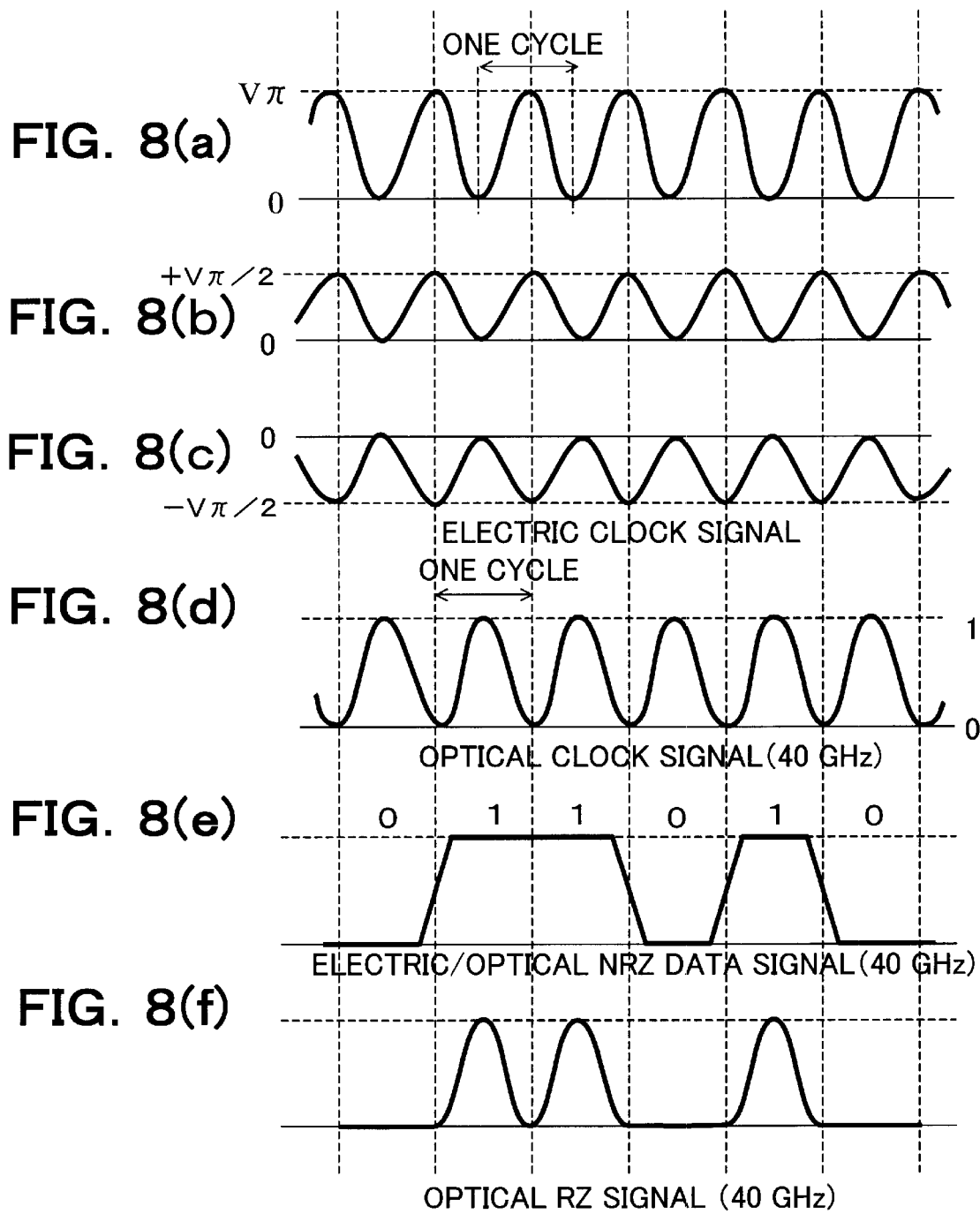

(a) tr, tf = 20ps (b) tr, tf = 80ps

DEPENDENCE OF NRZ SIGNAL ON tr AND tf (20 ps/div.)

EYE PATTERN tr,tf=5 ps   tr,tf=10 ps   tr,tf=20 ps

ELECTRIC SIGNAL tr,tf=5 ps   tr,tf=10 ps   tr,tf=20 ps

NRZ tr,tf=5 ps   tr,tf=10 ps   tr,tf=20 ps

RZ

EYE PATTERN CORRESPONDING TO ELECTRIC SIGNALS tr AND tf

DEPENDENCE OF AREA OF EYE OPENING ON ELECTRIC SIGNALS tr AND tf

DEPENDENCE OF DEGRADATION OF EYE OPENING ON
DELAY BETWEEN DATA SIGNALS
(OPTICAL MODULATOR OF NRZ DUAL DRIVE TYPE)

WAVELENGTH CHIRP ARISING WHEN DELAY OF 4 ps
ARISES BETWEEN DATA SIGNALS
(OPTICAL MODULATOR OF NRZ DUAL DRIVE TYPE)

DEPENDENCE OF DEGRADATION OF EYE
OPENING ON DELAY BETWEEN CLOCK
SIGNAL AND DATA SIGNAL

DEPENDENCE OF DEGRADATION OF EYE OPENING ON DELAY BETWEEN CLOCK SIGNALS

DEPENDENCE OF DEGRADATION OF EYE OPENING ON TOTAL AMOUNT OF RESIDUAL DISPERSION OF MODULATOR (SMF 500 km    RELAY INTERVAL OF 100km)

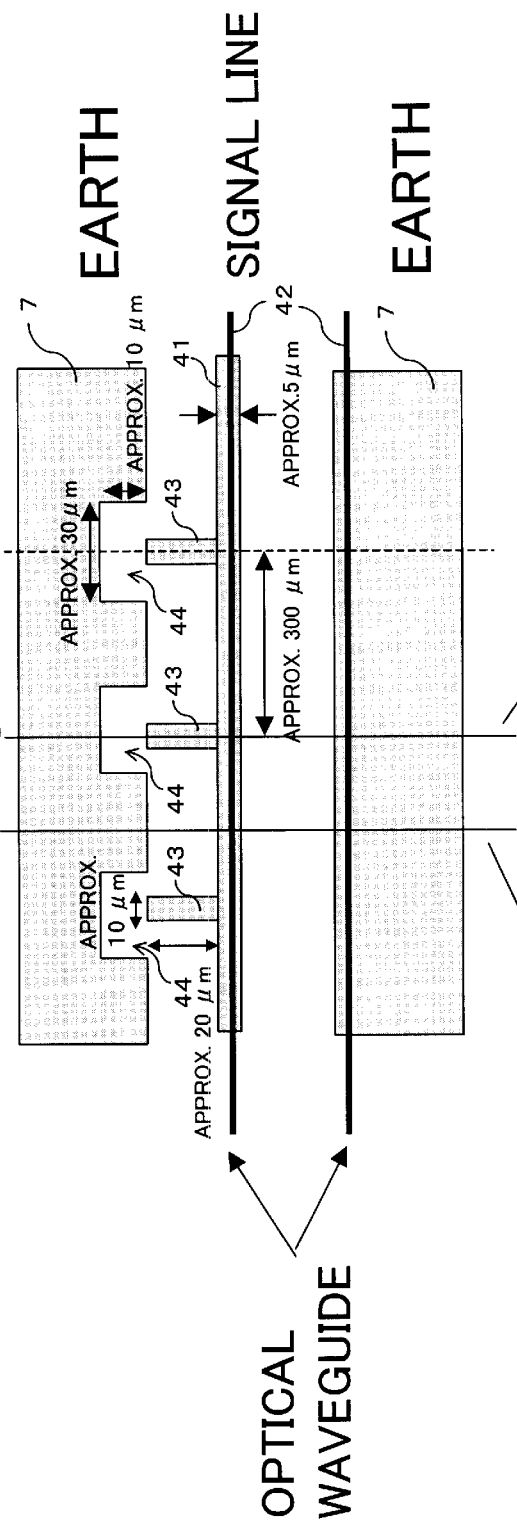
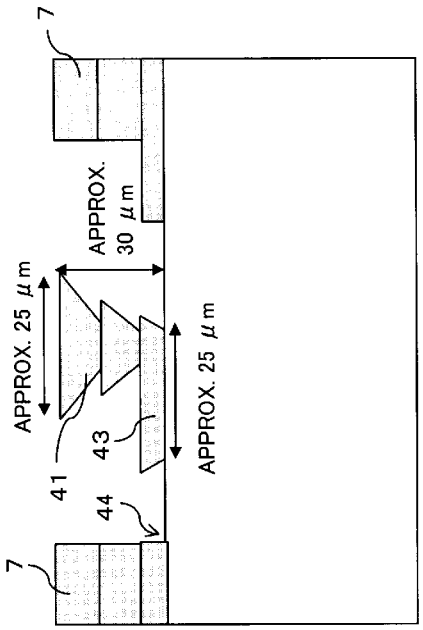
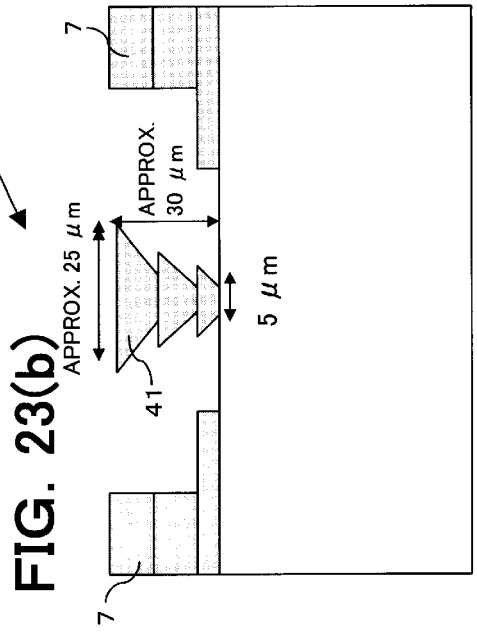
FIG. 23(a)
FIG. 23(b)
FIG. 23(c)

OPTICAL MODULATOR OF CLOCK MODULATION TYPE

BACKGROUND OF THE INVENTION

The present invention relates to an optical modulator of clock modulation type.

In accordance with recent increases in data transmission rates, development of an optical modulator for modulating a data signal into an optical signal from an electric signal has been performed vigorously in the field of long-distance optical communications systems, such as in a submarine optical communication system. In the field of long distance optical communications systems such as in submarine optical communication, attention has been paid to a transmission scheme using an RZ (return-to-zero) signal as an optical signal to be transmitted rather than to another transmission scheme using an NRZ (non-return-to-zero) signal, because the transmission scheme using an RZ signal has a wide range of tolerance of dispersion and an improved receiving sensitivity characteristic.

When RZ optical modulation is effected through use of an external optical modulator in order to transmit the previously-described optical RZ signal, there is a necessity for a driver circuit which is higher in frequency than a driver circuit for effecting NRZ optical modulation. Manufacture of a driver circuit for subjecting data of 40 Gb/s to RZ modulation using a current semiconductor element is difficult.

SUMMARY OF THE INVENTION

The present invention is aimed at providing an optical modulator of clock modulation type which integrates, into a single chip, two modulators; that is, a modulator for effecting encoding through use of an NRZ electric signal and a modulator for generating an RZ signal, thereby enabling reduction in space while improving the tolerance of the optical modulator and reducing costs required for constructing the same.

To this end, the present invention provides an optical modulator of clock modulation type comprising:

a substrate possessing an electro-optical effect;

a first optical waveguide of Mach-Zehnder type formed on the substrate;

a second optical waveguide of Mach-Zehnder type formed on the substrate so as to be concatenated with the first optical waveguide of Mach-Zehnder type;

a first electrode formed on the substrate for controlling light propagating through the first optical waveguide;

a second electrode formed on the substrate for controlling light propagating through the second optical waveguide;

the first optical waveguide, the second optical waveguide, the first electrode, and the second electrode being integrated in the substrate;

a clock signal generator which is connected to either the first or second electrode and which produces an RZ (return-to-zero) signal by applying a clock signal to either the first or second electrode; and an NRZ (non-return-to-zero) data signal generator which is connected to either the first or second electrode and supplies an NRZ data signal to either the first or second electrode.

Thus, in the optical modulator of clock modulation type according to the present invention, the first optical waveguide, the second optical waveguide, the first electrode, and the second electrode are integrated in the substrate. The optical modulator is further provided with the clock signal generator and the NRZ data signal generator. Thus, the space required by the optical modulator is reduced while tolerance of the same is improved, thus diminishing costs required for constructing the optical modulator.

Preferably, the first optical waveguide, the second optical waveguide, the first electrode, and the second electrode may be integrated in the substrate in a single chip. Further, each of the first and second electrodes may preferably be constituted of a signal electrode and a ground electrode, and the ground electrode may preferably be shared between the first and second electrodes.

Further, in a preferable configuration, one of the first or second electrodes is constituted as a dual electrode having two signal electrodes, and the remaining electrode is constituted as a single electrode having one signal electrode.

Alternatively, each of the first and second electrodes maybe constituted as a dual electrode having two signal electrodes, or each of the first and second electrodes may be constituted as a single electrode having one signal electrode.

Preferably, the clock signal generator may be constituted so as to generate an RZ signal having a transmission speed equal to a per-unit-time transmission speed of light output from the optical modulator of clock modulation type, by applying, to either the first or second electrode, a clock signal having a frequency which corresponds to half the per-unit-time transmission speed of the light output from the optical modulator of clock modulation type.

In this case, the per-unit-time transmission speed of the light output from the optical modulator of clock modulation type may preferably be set to a value of at least 10 Gb/s or more, and the frequency of the clock signal may preferably be set to a value of 5 GHz or more. Preferably, the transmission speed may be set to a value of 40 Gb/s or more, and the frequency may be set to a value of 20 GHz or more.

In the present invention, the optical modulator is provided with the clock signal generator which applies, to either the first or second electrode, a clock signal having a frequency which is half the per-unit-time transmission speed of the light output from the optical modulator of clock modulation type. As a result, a clock signal generator is less costly to constitute than a clock signal generator which applies, to either the first or second electrode, a clock signal having a frequency corresponding to the per-unit-time transmission speed of the light output from the optical modulator of clock modulation type.

Moreover, the clock signal generator may preferably be constituted so as to generate an RZ signal having a transmission speed equal to a per-unit-time transmission speed of light output from the optical modulator of clock modulation type, by applying, to either the first or second electrode, a clock signal having a frequency corresponding to the per-unit-time transmission speed of the light output from the optical modulator of clock modulation type.

In this case, the per-unit-time transmission speed of the light output from the optical modulator of clock modulation type may preferably be set to a value of at least 10 Gb/s or more, or, more preferably, a value of 40 Gb/s or more, and the frequency of the clock signal may preferably be set to a value of 10 GHz or more, or, more preferably, a value of 40 GHz or more.

Preferably, the substrate may be formed from lithium niobate, lithium tantalate, or a lithium niobate crystal, and the substrate may be cut along a Z axis.

According to the present invention, since the substrate is cut along the Z-axis, matching can be readily achieved in connection with parameters to be used for evaluating performance when a high-speed optical modulator is constructed in connection with four parameters; namely, a drive voltage, a match between the speed of a light signal and the speed of an electric signal, an attenuation constant of an electric signal, and a characteristic impedance.

Further, the first and second optical waveguides are concatenated with each other by means of a concatenate waveguide, and light loss reduction means can be formed in the vicinity of the concatenate waveguide.

The present invention also provides an optical modulator of clock modulation type comprising:

a substrate formed from lithium niobate;

a first optical waveguide of Mach-Zehnder type formed on the substrate;

a second optical waveguide of Mach-Zehnder type formed on the substrate so as to be connected with the first optical waveguide of Mach-Zehnder type;

a first electrode formed on the substrate for controlling light propagating through the first optical waveguide;

a second electrode formed on the substrate for controlling light propagating through the second optical waveguide;

the first optical waveguide, the second optical waveguide, the first electrode, and the second electrode being integrated in the substrate;

a clock signal generator which is connected to the first electrode and produces an RZ signal by applying a clock signal to the first electrode; and an NRZ data signal generator which is connected to the second electrode and supplies an NRZ data signal to the second electrode.

Thus, in the optical modulator of clock modulation type according to the present invention, the first optical waveguide, the second optical waveguide, the first electrode, and the second electrode are integrated in one chip on the substrate. The optical modulator is further provided with the clock signal generator and the NRZ data signal generator. Thus, the space required by the optical modulator is reduced while tolerance of the same is improved, thus reducing costs required for constructing the optical modulator.

Preferably, each of the first and second electrodes may be constituted of a signal electrode and a ground electrode, and a ground electrode may be shared between the first and second electrodes.

Furthermore, either the first electrode or the second electrode may preferably be constituted as a dual electrode having two signal electrodes, and the remaining one of the first and second electrodes may preferably be constituted as a single electrode having one signal electrode. Moreover, each of the first electrode and the second electrode may preferably be constituted as a dual electrode having two signal electrodes, or each of the first electrode and the second electrode may preferably be constituted as a single electrode having one signal electrode.

Preferably, the substrate may be cut along a Z axis.

According to the present invention, since the substrate is cut along the Z-axis, matching can be readily achieved in connection with parameters to be used for evaluating performance when a high-speed optical modulator is constructed in connection with three parameters; namely, a drive voltage, a match between the speed of a light signal and the speed of an electric signal, an attenuation constant of an electric signal, and a characteristic impedance.

The optical modulator of clock modulation type according to the present invention is constituted of a first Mach-Zehnder optical modulator, a second Mach-Zehnder optical modulator, a clock signal generator, and an NRZ data signal generator.

More specifically, the first Mach-Zehnder optical modulator includes a substrate possessing an electro-optical effect; a first optical waveguide of Mach-Zehnder type formed on the substrate; and a first electrode formed on the substrate for controlling light propagating through the first optical waveguide.

Further, the second Mach-Zehnder optical modulator is concatenated with the first Mach-Zehnder optical modulator, includes the substrate shared with the first Mach-Zehnder optical modulator, a second optical waveguide of Mach-Zehnder type formed on the substrate and connected to the first optical waveguide and a second electrode formed on the substrate for controlling light propagating through the second optical waveguide, and is integrated with the first Mach-Zehnder optical modulator.

Moreover, the clock signal generator is connected to either the first or second electrode and produces an RZ signal by applying a clock signal to the same.

The NRZ data signal generator is connected to the remaining one of the first and second electrodes and supplies an NRZ data signal to the same.

Consequently, the optical modulator of clock modulation type according to the present invention is constituted by integrating a modulator for effecting encoding operation using an NRZ electric signal, and a modulator for generating an RZ signal. As a result, the space required by an optical modulator can be reduced while the tolerance of the optical modulator is improved. Thus, the optical modulator has advantageously lower construction costs.

BRIEF DESCRIPTION OF THE DRAWINGS

FIGS. 3 through 6(f) are plots for describing optical modulating operation of the optical modulator of clock modulation type according to the first embodiment;

FIGS. 8(a) through 8(f) are plots for describing optical modulating operation of the optical modulator of clock modulation type according to the modification of the first embodiment;

FIGS. 23(a) through 23(c) are illustrations showing the relationship between a signal electrode, a bias electrode, and a ground electrode (earth) shown in FIGS. 1, 7, and 20 through 22.

DESCRIPTION OF THE PREFERRED EMBODIMENTS

Preferred embodiments of the present invention will be described by reference to the accompanying drawings.

(a1) Description of a First Embodiment

Figure 1:
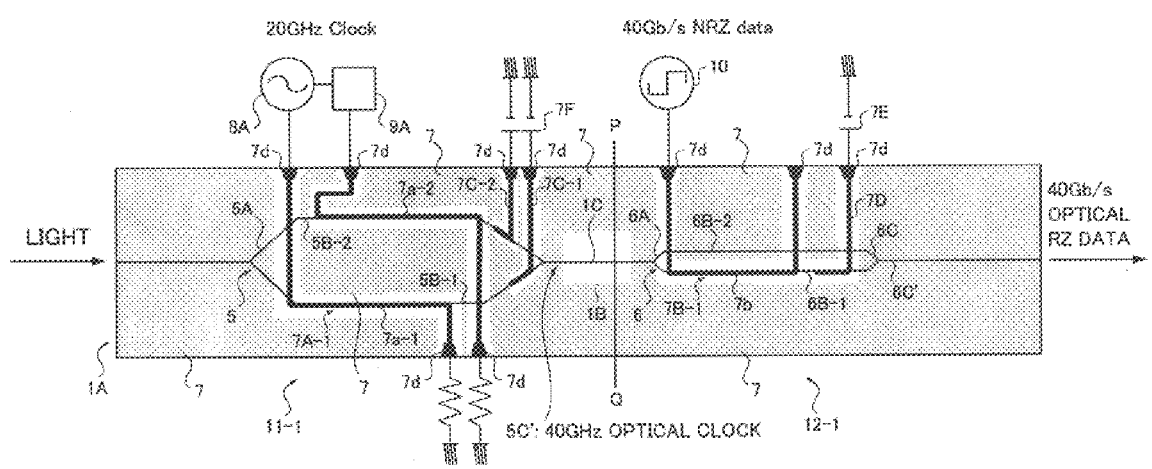
FIG. 1 is a schematic diagram showing an optical modulator of clock modulation type according to a first embodiment of the present invention.

FIG. 1 is a schematic diagram showing a optical modulator of clock modulation type according to a first embodiment of the present invention. An optical modulator of clock modulation type 1 shown in FIG. 1 is used as a device to be installed at a transmitting end of, e.g., a long-distance optical transmission system. The optical modulator 1 modulates unillustrated light originating from an unillustrated light source (semiconductor laser), through use of a transmission data signal. The thus-modulated light signal is transmitted to a receiving end by way of an unillustrated optical fiber.

The optical modulator of clock modulation type 1 shown in FIG. 1 comprises a substrate 1A which is formed from lithium niobate (LiNbO$_3$) and is cut along the Z-axis direction of crystal orientation thereof. A first optical waveguide of Mach-Zehnder type 5 (hereinafter referred to simply as a "first optical waveguide 5"), a second optical waveguide of Mach-Zehnder type 6 (hereinafter referred to simply as a "second optical waveguide 6"), a first electrode 7A-1, and a second electrode 7A-2 are formed on the substrate 1A. The optical modulator 1 is integrated into a single chip.

The first optical waveguide 5 and the second optical waveguide 6 are formed integrally from titanium (Ti), by means of thermal dispersion such that the first optical waveguide 5 and the second optical waveguide 6 are concatenated with each other. As a result, light originating from the light source enters an input end of the optical modulator 1 and is propagated to the first optical waveguide 5 and the second optical waveguide 6.

The first optical waveguide 5 is divided into a Y-shaped branch waveguide 5A to be disposed at an entrance side, two linear arm waveguides 5B-1 and 5B-2, and a Y-shaped branch waveguide 5C to be disposed at an exit side. Similarly, the second optical waveguide 6 is divided into a Y-shaped branch waveguide 6A to be disposed at an entrance side, two linear arm waveguides 6B-1 and 6B-2, and a Y-shaped branch waveguide 6C to be disposed at an exit side.

A first electrode 7A-1 is formed on the substrate 1A as a partial electrode layer for controlling the light that propagates through the first optical waveguide 5. A second electrode 7B-1 is formed on the substrate 1A as a partial electrode layer for controlling the light that propagates through the second optical waveguide 6.

Here, the first electrode 7A-1 comprises a dual electrode and a ground electrode 7, wherein the dual electrode includes two signal electrodes 7a-1 and 7a-2. Further, the second electrode 7B-1 comprises a single signal electrode 7b and the ground electrode 7.

The signal electrodes 7a-1 and 7a-2 of the first electrode 7A-1 are formed so as to establish continuity between contact points of two connectors provided on respective longitudinal side edges of the substrate 1A. The signal electrode 7a-1 is formed such that a portion of the signal electrode 7a-1 overlaps one linear arm waveguide 5B-1 of the first optical waveguide 5. Further, the signal electrode 7a-2 is formed such that a portion of the signal electrode 7a-2 overlaps the linear arm waveguide 5B-2 of the first optical waveguide 5.

The signal electrode 7b formed on the second optical waveguide 6 is formed so as to establish continuity between contact points of two connectors provided on the respective longitudinal side edges of the substrate 1A. The signal electrode 6B-1 is formed such that a portion of the signal electrode 6B-1 overlaps the second optical waveguide 6.

The ground electrode 7 is formed as a ground electrode to be shared between the first and second electrodes 7A-1 and 7B-1. The signal electrodes 7a-1, 7a-2, and 7b and bias electrodes 7C-1, 7C-2, and 7D to be described later are spaced at given intervals, thereby forming a coplanar line on the substrate 1A.

Here, reference numeral 7d designates connection pads which are formed comparatively wide and as connector contacts for electrical-wiring of the signal electrodes 7a-1, 7a-2, and 7b.

The bias electrodes 7C-1 and 7C-2 are connected to an unillustrated d.c. power supply, whereby a bias voltage is supplied to the first optical waveguide 5. As a result, there is formed a dual bias electrode for supplementally imparting an application voltage for clock modulation. The bias electrode 7C-1 is formed so as to extend along a portion of the linear arm waveguide 5B-1 of the Y-shaped branch waveguide 5C, and the bias electrode 7C-2 is formed so as to extend along a portion of the linear arm waveguide 5B-2 of the Y-shaped branch waveguide 5C.

The bias electrode 7D serves as a single electrode and imparts to the second optical waveguide 6 a d.c. voltage supplied from a d.c. power supply 7E, thereby supplementally imparting an application voltage for NRZ optical modulation. The bias electrode 7D is formed so as to partially overlap the linear arm waveguide 6B-1. In the event of changes arising in the modulation characteristics of the optical modulator of clock modulation type 1 for reasons of changes in temperature, the modulation efficiency of the optical modulator 1 can be maintained at an optimum modulation efficiency, by means of a bias voltage supplied from the bias electrode 7D.

Each of the bias electrodes 7C-1, 7C-2, and 7D is provided with the connection pad 7d, as are the signal electrodes 7a-1, 7a-2, and 7b.

Figure 2:
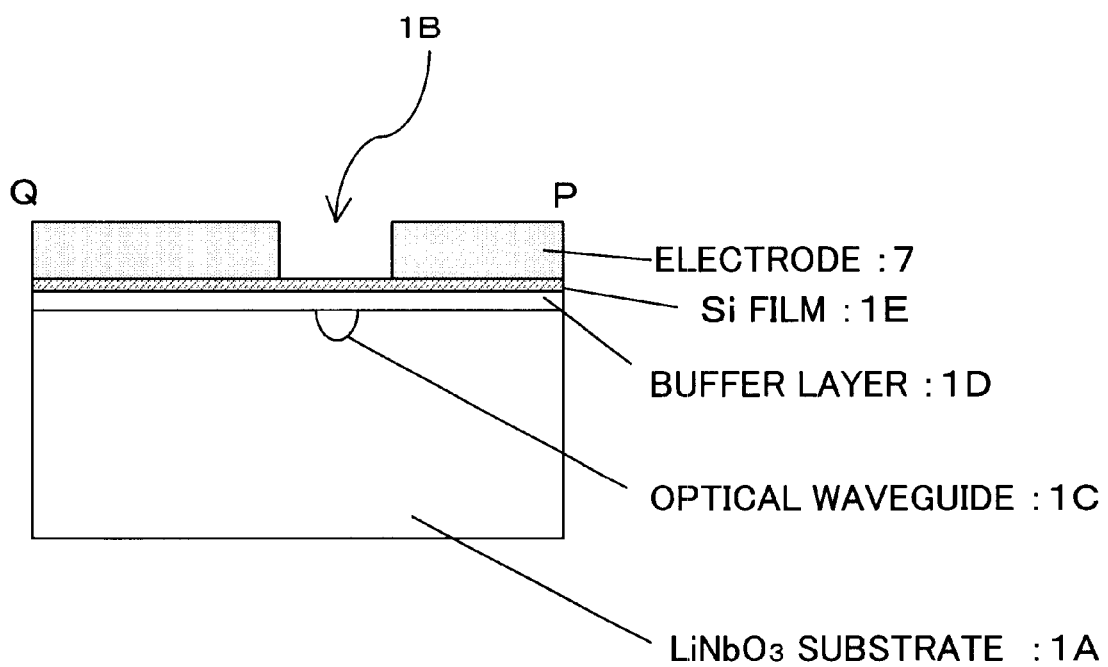
FIG. 2 is a cross-sectional view showing the principal section of the optical modulator of clock modulation type according to the first embodiment.

FIG. 2 is a cross-sectional view of the optical modulator of clock modulation type 1 shown in FIG. 1, which view is taken along line PQ shown in FIG. 1. As shown in FIG. 2, reference numeral 1B designates a ground electrode absence region which acts as light loss reduction means for diminishing a loss arising in light propagating through a waveguide 1C, which waveguide serves as a junction between the first optical waveguide 5 and the second optical waveguide 6.

As shown in FIG. 2, a buffer layer 1D and a silicon (Si) film 1E, which are thinner than the substrate 1A, are sandwiched between the substrate 1A and the ground electrode layer 7 of the first and second electrodes 7A and 7B and of the bias electrodes 7C and 7D.

Reference numeral 8A designates a clock signal generation drive section. The clock signal generation drive section 8A generates a sinusoidal signal having a frequency of 20 GHz, such as that shown in, e.g., FIG. 6(b). By way of the connection pad 7d, the thus-generated sinusoidal signal of 20 GHz is applied to the signal electrode 7a-1, which is one of the signal electrodes constituting the dual electrode.

The clock signal generation driver section 8A shown in FIG. 1 is illustrated as one which generates a sinusoidal waveform having a frequency of 20 GHz.

Reference numeral 9A designates a phase delay section. The phase delay section 9A retards a clock signal output from the clock signal generation section 8A by a time ($\tau$) corresponding to a predetermined phase (180 degrees), thereby converting a voltage. A clock signal of 20 GHz [see FIG. 6(c)] output from the phase delay section 9A is applied to the remaining signal electrode 7a-2 of the dual electrode, by way of the connection pad 7d.

Figure 3:
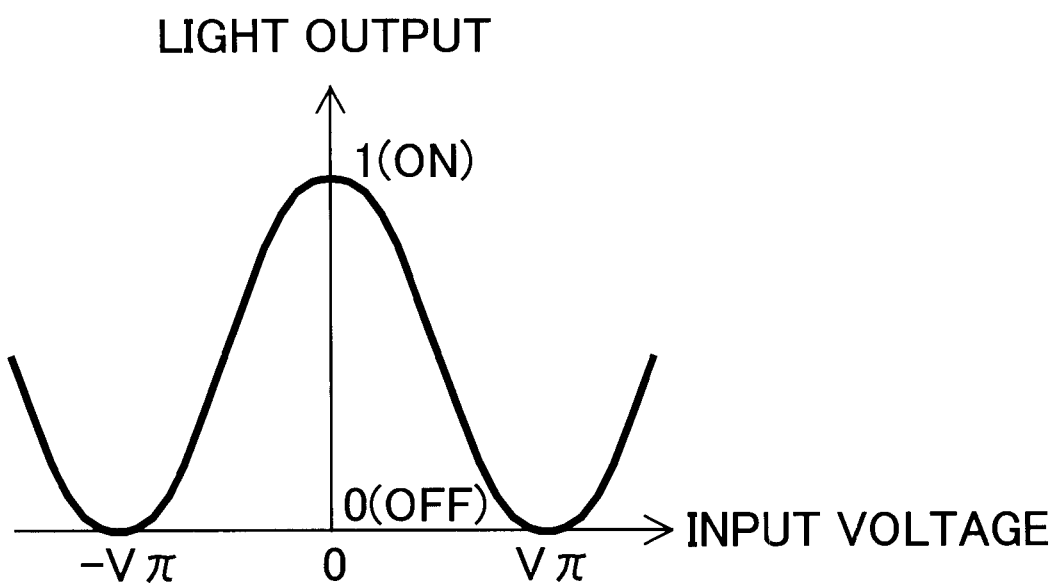

In the present embodiment, the optical level of light which propagates through the waveguide changes in the manner of a cosine waveform, as shown in FIG. 3, in accordance with a voltage supplied by way of an electrode, by virtue of an electro-optic effect. More specifically, as shown in FIG. 3, when the voltage applied to the electrode is set to a value of 0, the maximum light output level of 1 is achieved. When the voltage applied to the electrode is set to "Vπ" or "−Vπ," the minimum light output level of "0" is obtained.

Figure 4:
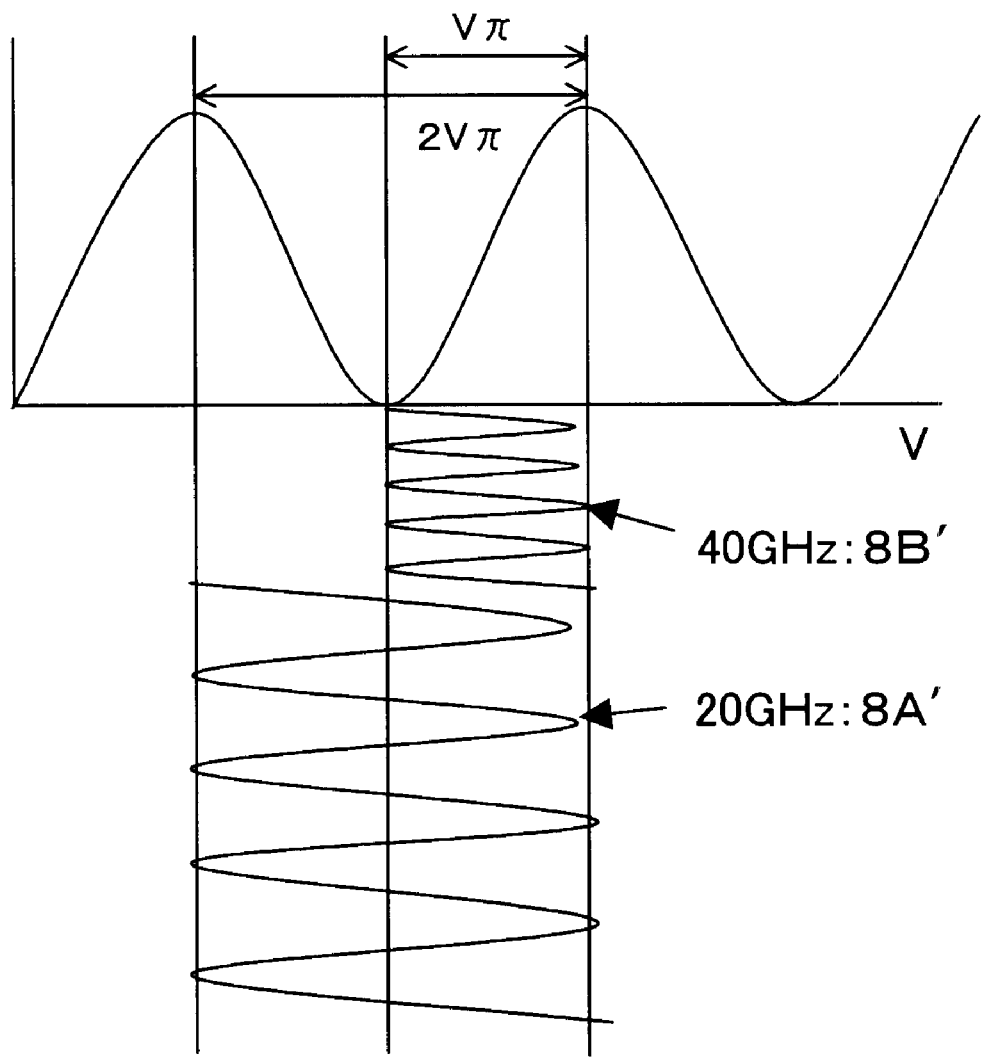

As shown in FIG. 4, there is a potential difference between the potential of the signal electrode 7a-1 and the potential of the signal electrode 7a-2, which difference is defined as the sinusoidal wave of 20 GHz produced by the clock signal generation drive section 8A (see the value of a potential difference waveform 8A' shown in FIG. 4). The amplitude of a clock signal is adjusted such that the maximum light output level is achieved at a phase in which the potential difference becomes maximum and minimum. In contrast, the amplitude of the clock signal is adjusted such that the minimum light output level is achieved at a phase in which the potential difference assumes an intermediate value. Accordingly, the light output level for two cycles can be changed by means of a change in the clock signal of one cycle.

The amplitude and phase of the clock signal of 20 GHz applied to each of the signal electrodes 7a-1 and 7a-2 are adjusted, and a bias voltage is applied to each of the bias electrodes 7C-1 and 7C-2. As a result, voltages can be adjusted such that a potential difference between the voltages becomes identical with the potential difference waveform 8A'.

The first optical waveguide of Mach-Zehnder type 11-1 comprising the first optical waveguide 5 and the first electrode 7A-1 modulates light originating from the light source. As a result, an optical clock signal of 40 GHz propagates through an output side of the Y-shaped branch waveguide 5C (see 5C' shown in FIG. 1).

In other words, the clock signals of 20 GHz—which are shown in FIGS. 6(b) and 6(c) and produced by the clock signal generation drive section 8A and the phase delay section 9A—are used for maintaining a potential difference between the signal electrodes 7a-1 and 7a-2 in the form of a sinusoidal wave of 20 GHz shown in FIG. 6(a). By means of the bias voltage applied to the bias electrode 7C-1 and that applied to the bias electrode 7C-2, the voltage applied to the optical waveguide arm 5B-1 and that applied to the optical waveguide arm 5B-2 are adjusted. As a result, the light originating from the light source is modulated into an optical clock signal of 40 GHz such as that shown in FIG. 6(d); that is, an RZ data signal of 40 Gb/s having a data array of "1," "1," "1," . . . . The thus-modulated RZ data signal is output.

The clock signal generation drive section 8A and the phase delay section 9A are connected to the first electrode 7A-1 and apply a clock signal to the first electrode 7A-1. As a result, the clock signal generation drive section 8A and the phase delay section 9A act as an optical clock signal generator for generating an optical RZ signal.

The clock signal generation drive section 8A and the phase delay section 9A apply, to the first electrode 7A-1, a clock signal having a frequency (of 20 GHz) which is half the per-unit-time transmission speed (of 40 Gb/s) of the light output from the optical modulator 1. Thus, there is produced an optical RZ signal which is equal in transmission speed with the light output from the optical modulator 1 (having a transmission speed of 40 Gb/s).

More specifically, by means of an electric signal applied to the first electrode 7A-1, the light which propagates through the linear arm waveguides 5B-1 and 5B-2 constituting the first optical waveguide 5 is subjected to an electro-optic effect. Accordingly, an optical RZ clock signal of 40 GHz can be output from an output side of the Y-shaped branch waveguide 5C (see reference numeral 5C' shown in FIG. 1).

Reference numeral 10 designates an NRZ data signal generator which is connected to the second electrode 7B-1. The NRZ data signal generator 10 is for supplying an NRZ data signal to the second electrode 7B-1.

In FIG. 1, the NRZ data signal generator 10 is illustrated as one which generates a clock signal of 40 GHz. Accordingly, the NRZ data signal generator 10 supplies to the signal electrode 7b of the second electrode 7B-1 an electric NRZ signal (consisting of data of 40 Gb/s representing "0," "1," "1," "0," "1," and "0"), such as that shown in FIG. 6(e).

Figure 5:
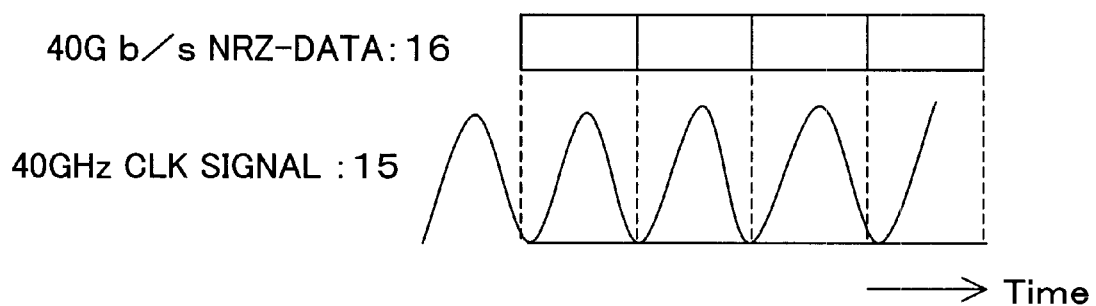

As shown in FIG. 5, a second optical waveguide of Mach-Zehnder type 12-1 comprising the second optical waveguide 6 and the second electrode 7B-1 modulates the NRZ data signal 16 of 40 Gb/s (depicted as 40 Gb/s NRZ-DATA) at a timing in synchronism with the optical clock signal of 40 GHz (i.e., an optical CLK signal of 40 GHz) output from the first optical waveguide 5. As a result, an optical RZ data signal of 40 Gb/s shown in FIG. 6(f) can be output.

More specifically, by means of an electric signal applied to the second electrode 7B-1, the light which propagates through the linear arm waveguide 6B-1 constituting the second optical waveguide 6 is subjected to an electro-optic effect. Accordingly, an optical RZ data signal of 40 Gb/s can be output from an output side of the Y-shaped branch waveguide 6C (see reference numeral 6C' shown in FIG. 1).

The first optical waveguide of Mach-Zehnder type 11-1 comprising the first optical waveguide 5 and the first electrode 7A-1, and the second optical waveguide of Mach-Zehnder type 12-1 comprising the second optical waveguide 5 and the second electrode 7B-1 are formed on the substrate 1A, thereby enabling integration and miniaturization of the optical modulator 1 of clock modulation type.

By means of the foregoing configuration of the optical modulator 1 of clock modulation type, an RZ signal having a frequency of 20 GHz arises in the clock signal generation drive section 8A during a phase in which the incident light originating from an unillustrated light source propagates through the first optical waveguide 5. The RZ signal is applied to the first electrode 7A-1, thus enabling generation of an optical RZ signal of 40 GHz from a sinusoidal wave of 20 GHz.

The signal electrodes 7a-1 and 7a-2 constituting the first electrode 7A-1 are constructed as a dual electrode. When the signal electrodes 7a-1 and 7a-2 are constructed in such a form as a dual electrode, drive voltages to be applied as voltage values to the signal electrodes can be diminished as compared with a case where a signal electrode is constituted of a single electrode.

The ground electrode absence region 1B—at which no ground electrode layer is to be formed—is provided in the waveguide 1C which interconnects the first optical waveguide 5 and the second optical waveguide 6. Absence of an electrode prevents an electrode from absorbing light, thus diminishing a loss arising in propagating light.

In a phase in which light propagates through the second optical waveguide 6, the NRZ signal of 40 Gb/s produced by the NRZ data signal generator 10 is applied to the second electrode 7B-1, there by modulating an optical clock signal. Consequently, the NRZ signal is modulated into an optical RZ data signal of 40 Gb/s.

An optical signal which has been modulated into the optical RZ data signal by the optical modulator 1 is transmitted to a receiving end by way of an unillustrated optical fiber.

In the optical modulator 1 of clock modulation type according to the first embodiment, the first optical waveguide 5, the second optical waveguide 6, the first electrode 7A-1, and the second electrode 7B-1 are integrated on the substrate 1A. Further, the optical modulator 1 is provided with the clock signal generation drive section 8A and the NRZ data signal generator 10. Thus, a modulator for effecting encoding operation using an NRZ electric signal and a modulator for generating an RZ signal are integrated into a single chip. As a result, the space occupied by an optical modulator can be reduced while the tolerance of the optical modulator is improved. Thus, the optical modulator has advantageously lower construction costs.

Of the first and second electrodes 7A-1 and 7B-1, the first electrode 7A-1 is formed as a dual electrode. In contrast with a case where a signal electrode is constructed as a single electrode, the dual electrode can reduce drive voltages which are supplied to the electrodes as voltage values. Hence, power consumption of the optical modulator 1 can be reduced.

Since the substrate 1A is cut along the Z-axis, matching can be readily achieved in connection with parameters to be used for evaluating performance when a high-speed optical modulator is constructed, or in connection with three parameters; namely, a drive voltage, a match between the speed of a light signal and the speed of an electric signal, an attenuation constant of an electric signal, and a characteristic impedance (usually 50 Ω).

(a2) Description of a Modification of a First Embodiment

In the first embodiment, the clock signal generation drive section 8A generates an optical clock signal of 40 GHz from the light propagating through the first optical waveguide 5, through use of a sinusoidal wave signal of 20 GHz (having a frequency half that of an optical RZ signal to be finally obtained).

Figure 7:
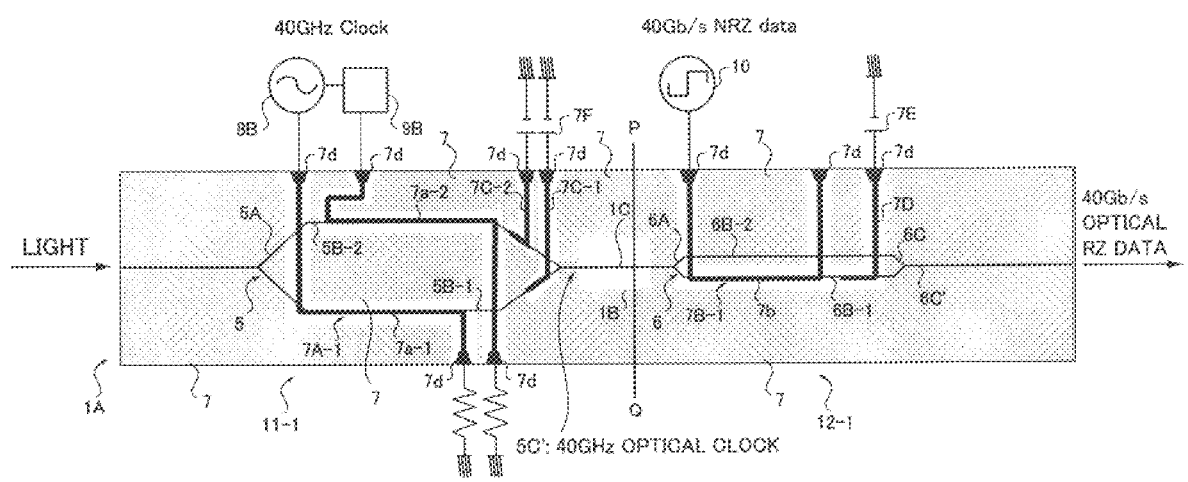
FIG. 7 is a schematic diagram for describing optical modulating operation of the optical modulator of clock modulation type according to a modification of the first embodiment.

In the modification of the first embodiment, an optical modulator of clock modulation type shown in FIG. 7 is provided with a clock signal generation drive section 8B which produces a sinusoidal wave of 40 GHz corresponding to the speed of a data signal speed to be finally obtained, in lieu of the clock signal generation drive section 8A which produces a sinusoidal wave of 20 GHz. Accordingly, the optical modulator 1-1 produces an optical clock signal of 40 GHz. The optical clock signal is modulated into an optical RZ data signal of 40 GB/s, by means of the second optical waveguide of Mach-Zehnder type provided in a subsequent stage.

In other words, the clock signal generation drive section 8B and a phase delay section 9B apply, to the first electrode 7A-1, a sinusoidal wave signal voltage having a frequency (of 40 GHz) corresponding to a per-unit-time transmission speed (40 Gb/s) of the light output from the optical modulator 1-1. As a result, there can be produced an RZ signal having a transmission speed (40 Gb/s) identical with a per-unit-time transmission speed (40 GHz) of the light output from the optical modulator 1-1.

The phase delay section 9B delays the clock signal of 40 GHz output from the clock signal generation drive section 8B by a time corresponding to a predetermined phase (180 degrees). Accordingly, the clock signal voltage output from the clock signal generation drive section 8B is applied to the signal electrode 7a-1. A clock signal voltage whose phase and voltage have been controlled by the phase delay section 9B is applied to the signal electrode 7a-2.

As can be seen from the value of a potential difference waveform 8B' shown in FIG. 4, the amplitude of the clock signal generated by the clock signal generation drive section 8B is adjusted such that an optical output level assumes the maximum value of 1 at a phase at which a potential difference between the signal electrode 7a-1 and the signal electrode 7a-2 becomes maximum. Further, the amplitude of the clock signal is adjusted such that an optical output level assumes a minimum value of "0" at a phase at which the potential difference becomes minimum. Thus, the optical output level can be changed for one cycle by means of a change in the sinusoidal wave output from the clock signal generation drive section 8B.

Through use of the electric clock signals of 40 GHz which are shown in FIGS. 8(b) and 8(c) and have been produced by the clock signal generation drive section 8B and the phase delay section 9B, a potential difference in the form of a sinusoidal wave of 40 GHz shown in FIG. 8(a) is applied between the signal electrodes 7a-1 and 7a-2. The light originating from the light source is modulated into an optical clock signal of 40 GHz such as that shown in FIG. 8(d) (i.e., a data signal of 40 Gb/s having a data array of "1," "1," "1," ... ). The thus-modulated RZ data signal is transmitted to the subsequent second optical waveguide 6.

As in the case of the optical modulator 1 shown in FIG. 1, the optical clock signal that propagates through the second optical waveguide 6 is modulated, by means of an electric NRZ data signal [i.e., a voltage signal shown in FIG. 8(e)] output from the NRZ data signal generator 10 being applied to the signal electrode 7d. The thus-modulated signal is output as an optical RZ data signal shown in FIG. 8(f).

The clock signal generation drive section 8B and the phase delay section 9B are connected to the first electrode 7A-1 and apply a clock signal to the first electrode 7A-1. Thus, the clock signal generation drive section 8B and the phase delay section 9B act as a clock signal generator for generating an RZ signal.

A potential difference of a sinusoidal wave capable of variably controlling an optical output level from a minimum value to a maximum value is Vπ, as shown in FIG. 4.

Even in the optical modulator 1-1 of clock modulation type shown in FIG. 7, the first optical waveguide 5, the second optical waveguide 6, the first electrode 7A-1, and the second electrode 7B-1 are integrated on the substrate 1A. Further, the optical modulator 1-1 is provided with the clock signal generation drive section 8B and the NRZ data signal generator 10. Thus, the optical modulator yields the same advantages as those yielded in the first embodiment.

As in the case of the optical modulator 1 shown in FIG. 1 and the optical modulator 1-1 shown in FIG. 7, the single clock signal generation drive section 8A or the single clock signal generation drive section 8B is used as a sinusoidal wave supply source to supply a sinusoidal wave signal to the two signal electrodes 7a-1 and 7a-2 constituting the first electrode 7A-1. Further, the phase delay section 9A or the phase delay section 9B produces a clock signal whose voltage has been adjusted so as to assume an opposite phase. However, the present invention is not limited to these optical modulators. The optical modulator may be constructed such that clock signal of opposite phases may be produced by two clock signal generation drive sections.

Figure 9A:
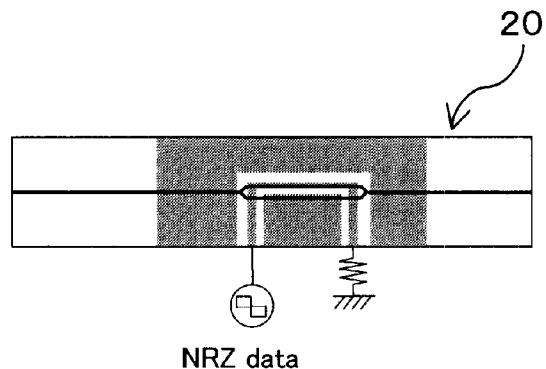
FIGS. 9(a) through 19 are illustrations for describing tolerance of the optical modulator of clock modulation type according to the first embodiment.
Figure 9B:
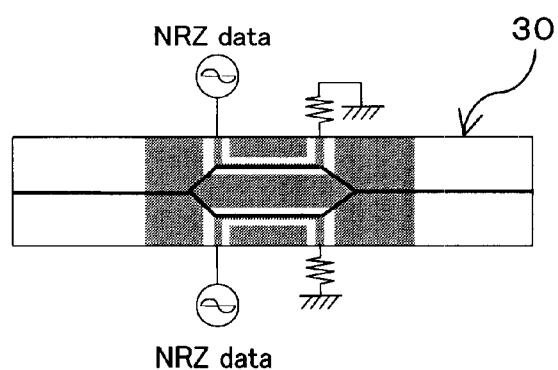
Figure 9C:
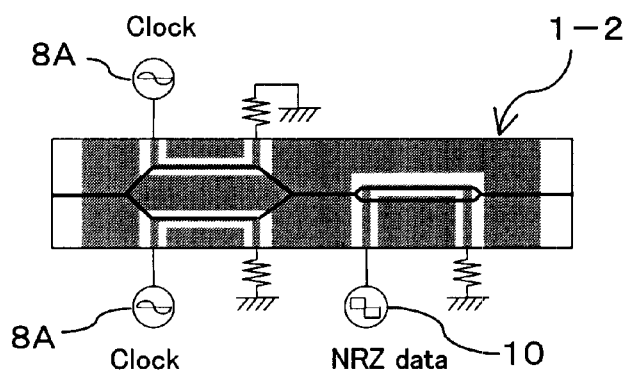

For instance, the optical modulator may be constructed like an optical modulator 1-2 of clock modulation type shown in FIG. 9(c). The optical modulator 1-2 may be provided with two clock signal generation sections 8A capable of producing clock signals of 10 GHz of opposite phases. It may be the case that one of the clock signal generation drive sections 8A applies a clock signal voltage to the signal electrode 7a-1, and the other clock signal generation drive section applies a clock signal voltage to the signal electrode 7a-2.

(a3) Description of Tolerance of an Optical Modulator of Clock Modulation Type

Next, tolerance of an optical modulator of clock modulation type will be described by reference to FIG. 9(c) (the same also applies to tolerance of the modulator 1 shown in FIG. 1 and to tolerance of the modulator 1-1 shown in FIG. 7).

When a high-speed optical modulator is usually constructed, the optical modulator must be designed in consideration of (1) a drive voltage, (2) a match between the speed of an optical signal and the speed of an electric signal, (3) an attenuation constant of the electric signal, (4) a characteristic impedance (usually 50 Ω), (5) a modulation band, (5) the amount of wavelength chirp, and (6) a loss.

In the following description, an explanation is given, as tolerance of the optical modulator 1-2, of particularly the dependence of an electric NRZ signal on $t_r$ and $t_f$, mutual phase-difference dependence of a clock signal/a data signal, and voltage tolerance of a clock signal.

Figure 10:
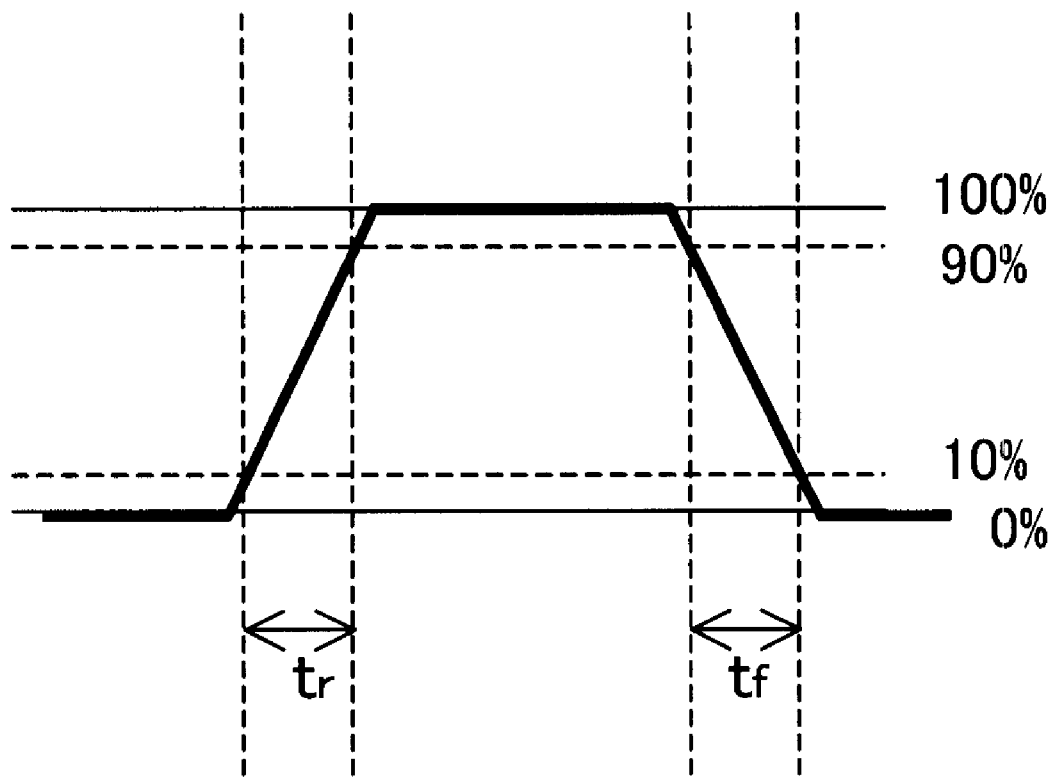

First, there will be described dependence of an electric NRZ signal on $t_r$ and $t_f$. As shown in FIG. 10, $t_r$ of the NRZ signal corresponds to a rise time when an NRZ signal changes from "0" to "1" (i.e., a time required by the NRZ signal to rise from 10% of the maximum level to 90% of the same). Here, $t_f$ corresponds to a fall time when an NRZ signal changes from "1" to "0" (i.e., a time required by the NRZ signal to fall from 90% of the maximum level to 10% of the same).

Figure 11A:
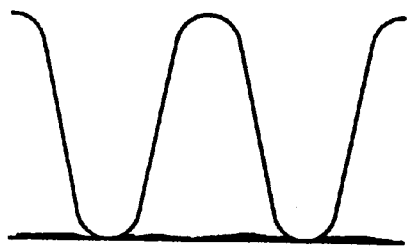
Figure 11B:
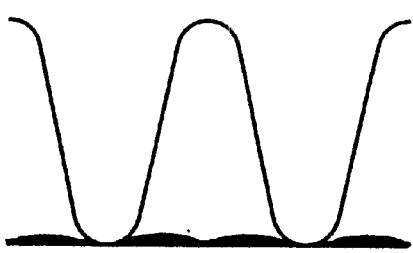

FIG. 11(a) shows an eye pattern obtained when the input NRZ electric signal has a $t_r$ of 20 ps (pico seconds) and a $t_f$ of 20 ps in the optical modulator 1-2, and FIG. 11(b) shows an eye pattern obtained when the input NRZ electric signal has a $t_r$ of 80 ps and a $t_f$ of 80 ps in the optical modulator 1-2. As shown in FIGS. 11(a) and 11(b), dependence of $t_r$ and $t_f$ on degradation of the eye pattern can be reduced.

The NRZ signal is converted into an RZ signal beforehand through use of a clock signal. Light corresponding to a leading edge and a trailing edge of the NRZ signal can be deleted. Accordingly, influence of distortions of an electric signal waveform corresponding to the leading and trailing edges can be alleviated.

A reduction in a difference between the phase of a clock signal and the phase of a data signal is of importance to the optical modulator of clock modulation type. In connection with dependence of phase difference between the clock signal and the data signal, the relationship between the phase difference and the eye pattern has been studied. The study results show that a phase difference of ±10%, or possibly even a greater phase difference, exerts little influence which would hinder optical transmission. In connection with the voltage tolerance of a clock signal, a voltage fluctuation of ±10%, or possibly even a greater voltage tolerance, does not induce degradation of an eye pattern, which would influence optical transmission.

Figure 12:
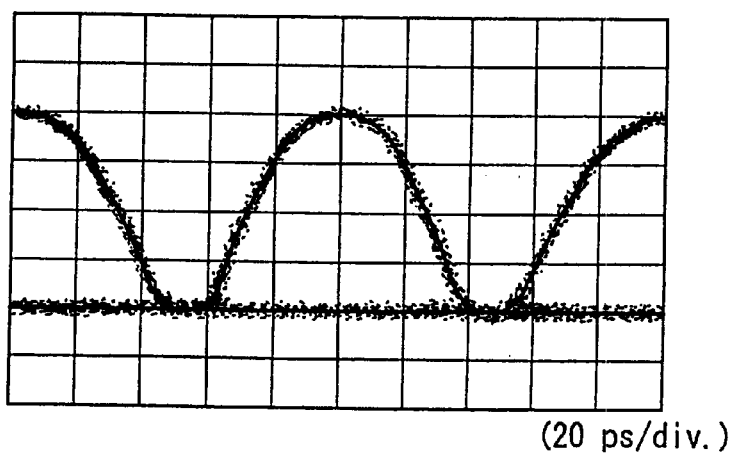

In more specific terms, there will now be described a case where an optical clock signal of 10 GHz is produced by means of the optical modulator 1-2 having a configuration shown in FIG. 9(c). A sinusoidal wave signal of 10 GHz is produced by two clock signal generation sections 8A. As shown in FIG. 12, even when a modulation voltage Vπ is set to 4.4 V, degradation of an eye pattern, which would affect optical transmission, is not observed.

In the two clock signal generation drive sections 8A of the optical modulator of clock modulation type 1-2 shown in FIG. 9(c), a clock signal of a frequency (of 10 GHz) corresponding to the transmission speed (of 10 Gb/s) is applied to the first electrode 7A-1. There is produced an RZ signal having the same transmission speed (10 Gb/s) as that of light output from the modulator 1-2. As in the case of the optical modulator shown in FIG. 1, there may be produced a clock signal having a frequency which is half the transmission speed of output light.

Subsequently, there will now be described the tolerance of the optical modulator 1-2 of clock modulation type when the modulator 1-2 is constructed such that the two clock signal generation drive sections 8A generate clock signals of 40 Gb/s and the NRZ data generator 10 produces NRZ data of 40 Gb/s, thereby enabling output of an optical RZ data signal of 40 Gb/s.

Before tolerance of the optical modulator 1-2 is described, there will be described influence that the number of electrodes and presence/absence of wavelength chirp exert on a light waveform, on inter-electrode phase adjustment, and on dispersion tolerance, while tolerance of an optical modulator 20 of NRZ single electrode type shown in FIG. 9(a) is compared with tolerance of an optical modulator 30 of NRZ dual drive type shown in FIG. 9(b).

Figure 13A:
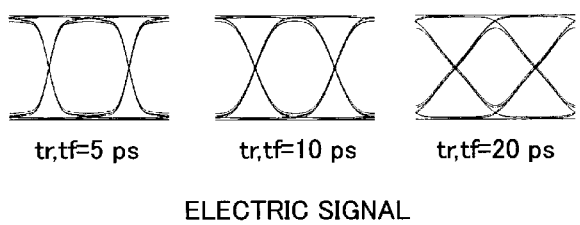
Figure 13B:
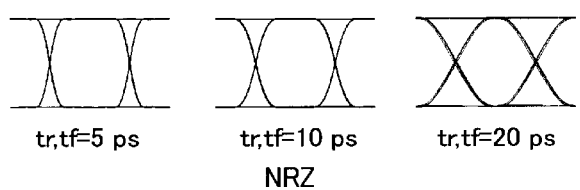
Figure 13C:
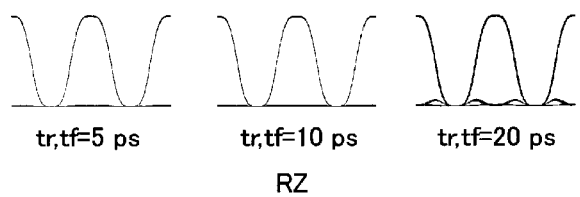

First, there will be described a modulation waveform of the optical modulator 1-2, that of the optical modulator 20, and that of the optical modulator 30. FIG. 13(a) shows the electric signals having $t_r$ and $t_f$ of 5 ps, $t_r$ and $t_f$ of 10 ps, and $t_r$ and $t_f$ of 20 ps. FIG. 13(b) shows optical response waveforms produced by the optical modulator 20 or 30. FIG. 13(c) shows optical response waveforms produced by the optical modulator 1-2.

As shown in FIG. 13(b), in the case of the optical modulator 20 or 30, the geometry of an eye pattern changes in accordance with a change in $t_r$ and $t_f$. In any event, there is observed a superior effect of amending a waveform as compared with the case of an electric waveform. In the case of the optical modulator 1-2 of clock modulation type, substantially no influence due to $t_r$ and $t_f$ is observed, as shown in FIG. 13(c).

Figure 14:
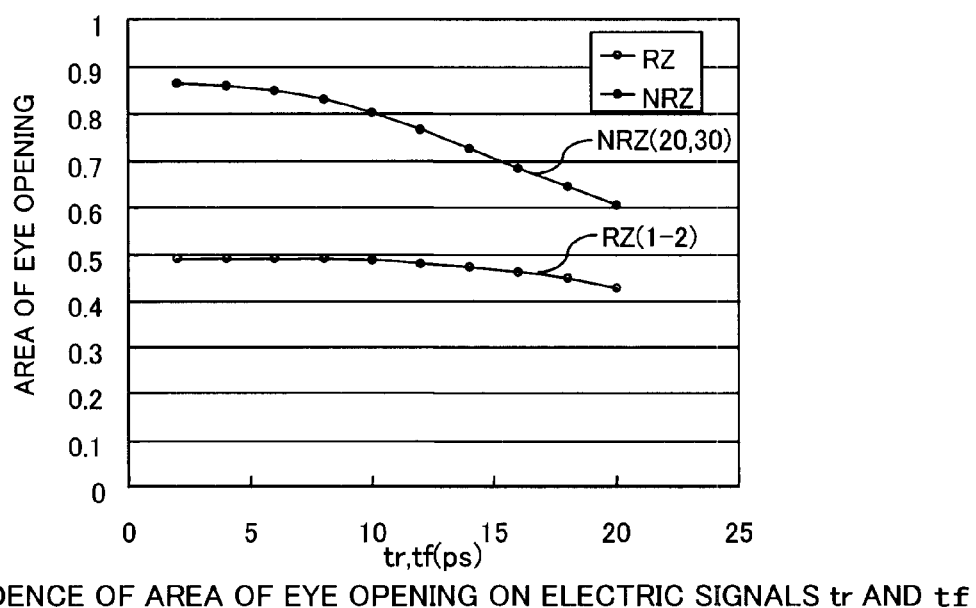

FIG. 14 is a plot showing the relationship between electric signals $t_r$ and $t_f$ and the areas of openings of an eye pattern.

As can be seen from FIG. 14 and FIGS. 13(a) through 13(c), the light modulated by the optical modulator 1-2 is less susceptible to the influence of an electric waveform than is the optical NRZ signal modulated by the optical modulator 20 or 30 of NRZ single electrode type.

In terms of resistance to influence of an electric waveform and a higher peak value and superior receiving sensitivity obtained at identical mean power, modulation of an optical RZ signal performed by the optical modulator 1-2 can be said to be superior to modulation of an NRZ signal performed by the optical modulator 20 or 30.

Tolerance of an optical modulator using a plurality of electrodes will now be described.

When an optical modulator is constructed from a plurality of electrodes as in the case of the optical modulator 30 of NRZ dual drive type and the optical modulator 1-2 of clock modulation type, there is a necessity of obtaining a match between signals even in either the optical modulator 30 or the optical modulator 1-2. Thus, synchronous adjustment of electrodes becomes important.

Figure 15:
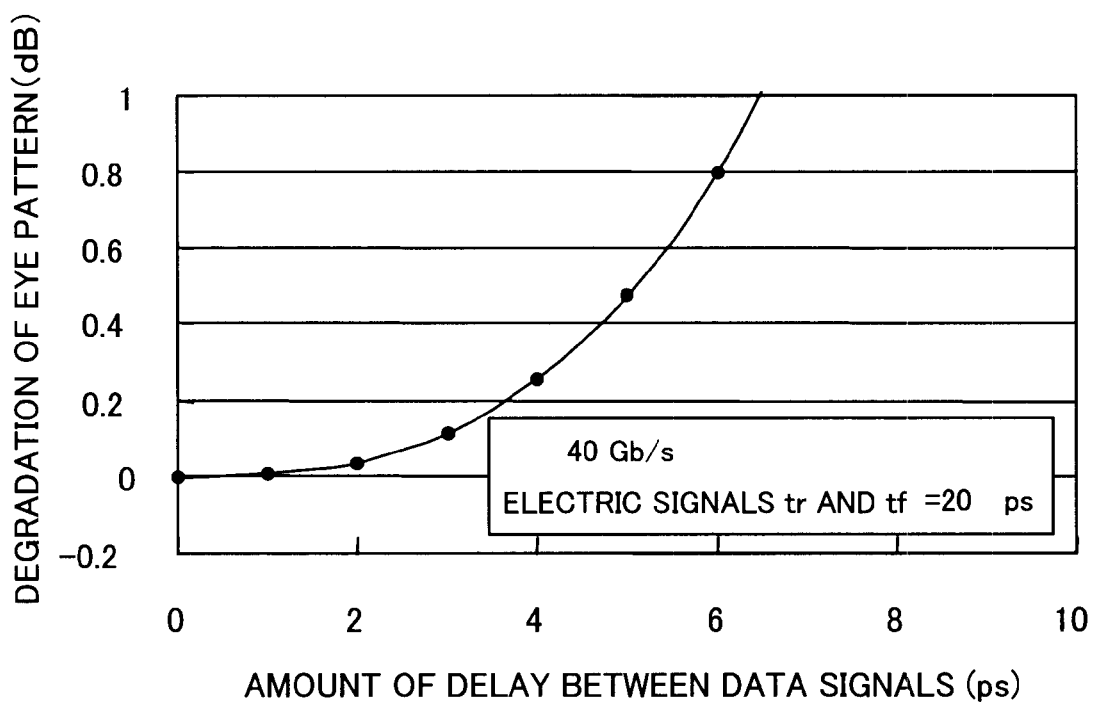

FIG. 15 shows dependence of degradation of an eye opening on the amount of delay in a signal in connection with the optical modulator 30 of NRZ dual drive type. In a case where the tolerance of degradation is set to, for example, 0.2 dB, the tolerance of a delay is 4 ps. A delay of 4 ps corresponds to a length of 1.2 mm in a vacuum. In consideration of a dielectric constant of a wire, an adjustment accuracy of less than 1 mm is required.

Figure 16A:
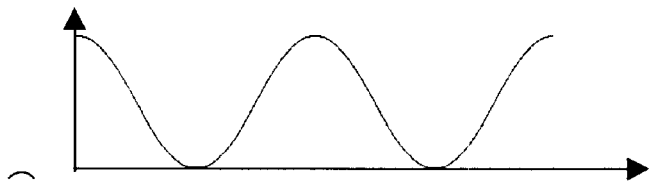
Figure 16B:
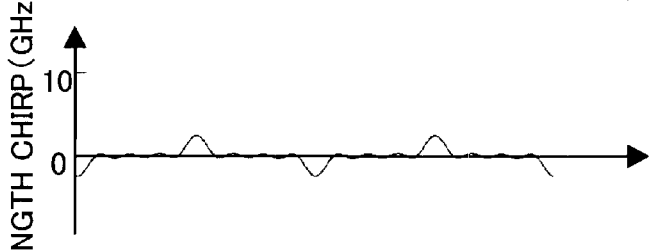

As a result of a study on the influence that a delay imposes on the amount of wavelength chirp, a delay of 4 ps is found to impose substantially no influence on chirp, as shown in FIGS. 16(a) and 16(b).

Figure 17:
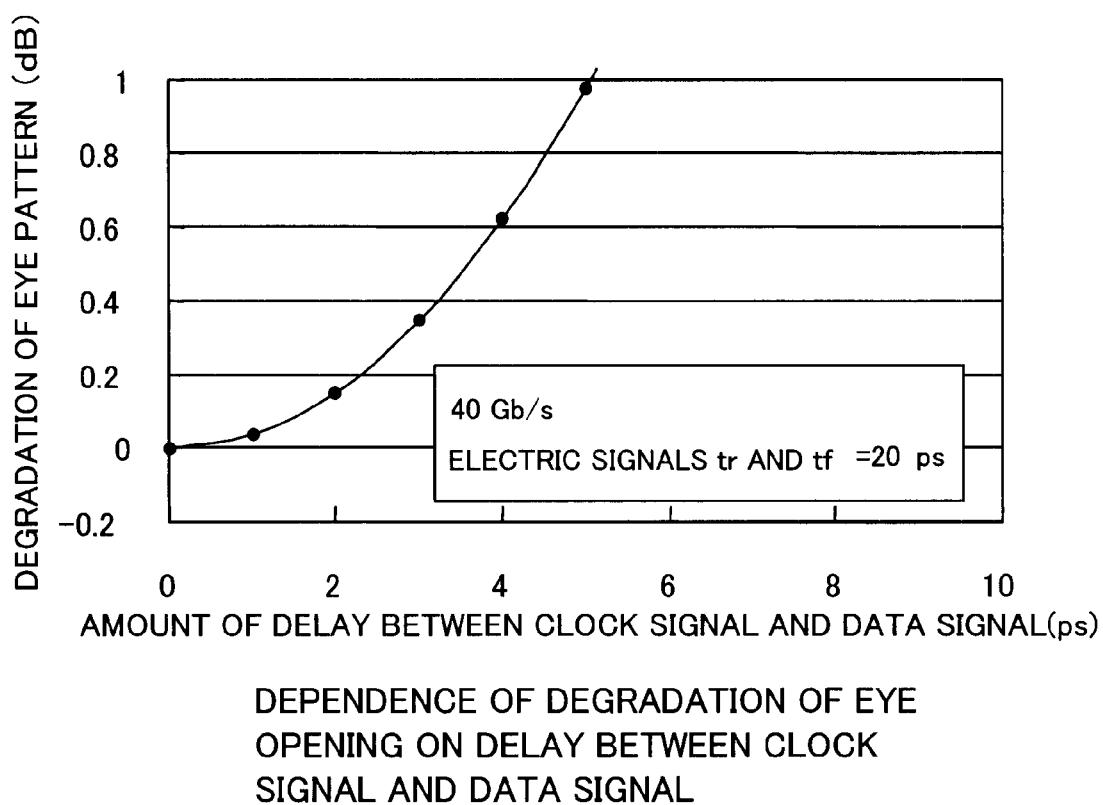
Figure 18:
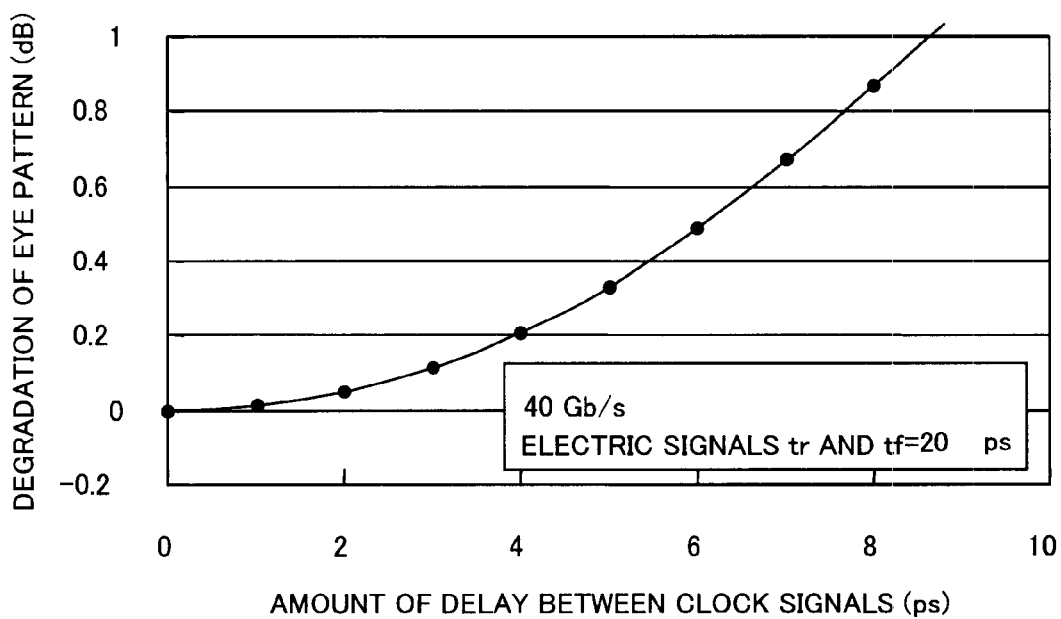

FIG. 17 shows the relationship between degradation of an eye opening and a delay time between the clock signals produced by the two clock signal generation drive sections 8A of the modulator 1-2 and the NRZ data signal produced by the NRZ data signal generator 10. Further, FIG. 18 shows the relationship between degradation of an eye opening and a delay time between the clock signals generated by the two clock signal generation drive sections 8A.

Influence of wavelength dispersion and a non-linear effect of an optical fiber will now be described.

The light waveforms produced by the optical modulators 1-2, 20, and 30 differ from each other in terms of the amount of wavelength chirp and electric signals $t_r$ and $t_f$. Consequently, a difference arises in the transmission characteristics of the light waveforms. The RZ-type optical modulator involves a spread spectrum wider than that yielded by the NRZ-type optical modulator and hence has lower tolerance of dispersion compensation. Self-phase modulation (SPM) depends on the amount of change in light intensity. For this reason, SPM imposes influence on the RZ-type optical modulator rather than on the NRZ-type optical modulator. Since the RZ-type optical modulator yields light of low light intensity and density, the light is less susceptible to the influence of four-wave mixing (FWM).

Figure 19:
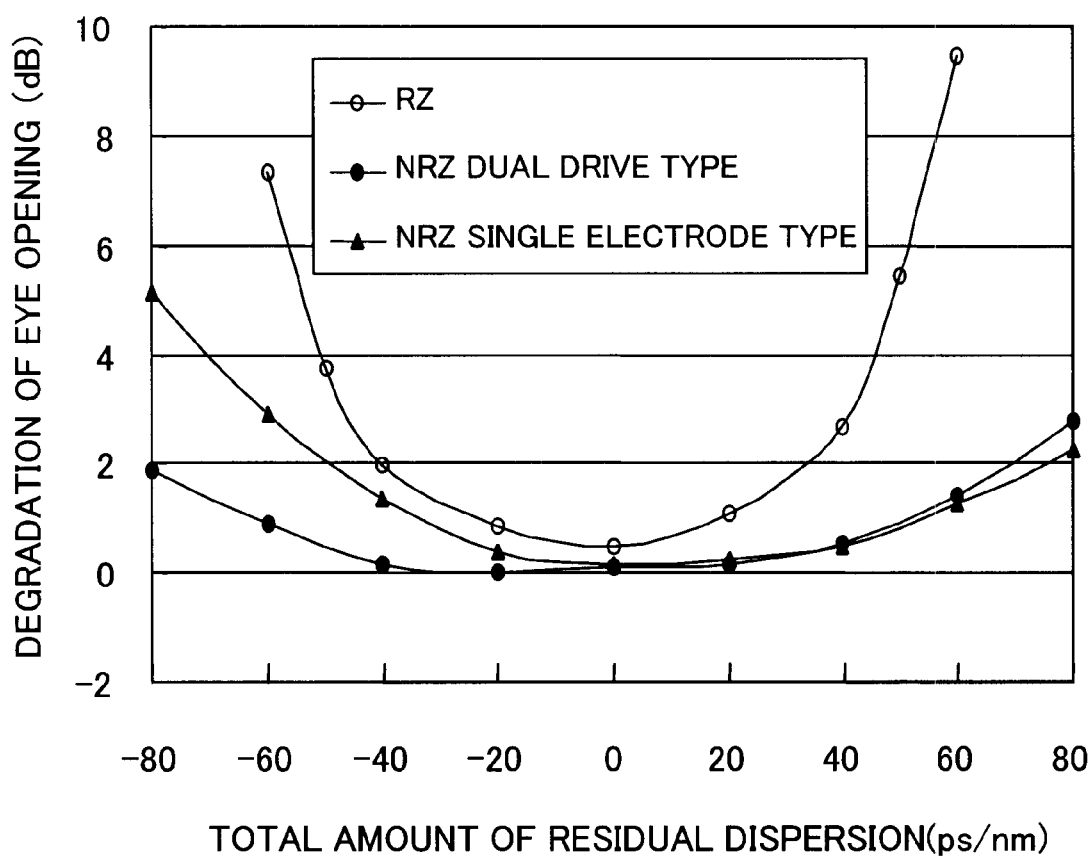

By way of an example, the influence of transmission of optical signal of 40 Gb/s in each of the optical modulators 1-2, 20, and 30 has been examined under a set of conditions; a wavelength band of 1550 nm, an interval of 200 GHz, 16 cycles, mean power of 1 dBm, a relay interval of 100 km, five spans, a single mode fiber (SMF, 16 ps/nm/km), and dispersion compensation. FIG. 19 shows the relationship between degradation of an eye opening and the influence of transmission of an optical signal, including the influences due to non-linear effects such as SPM, XPM (cross-phase modulation), and FWM.

(b) Description of a Second Embodiment

Figure 20:
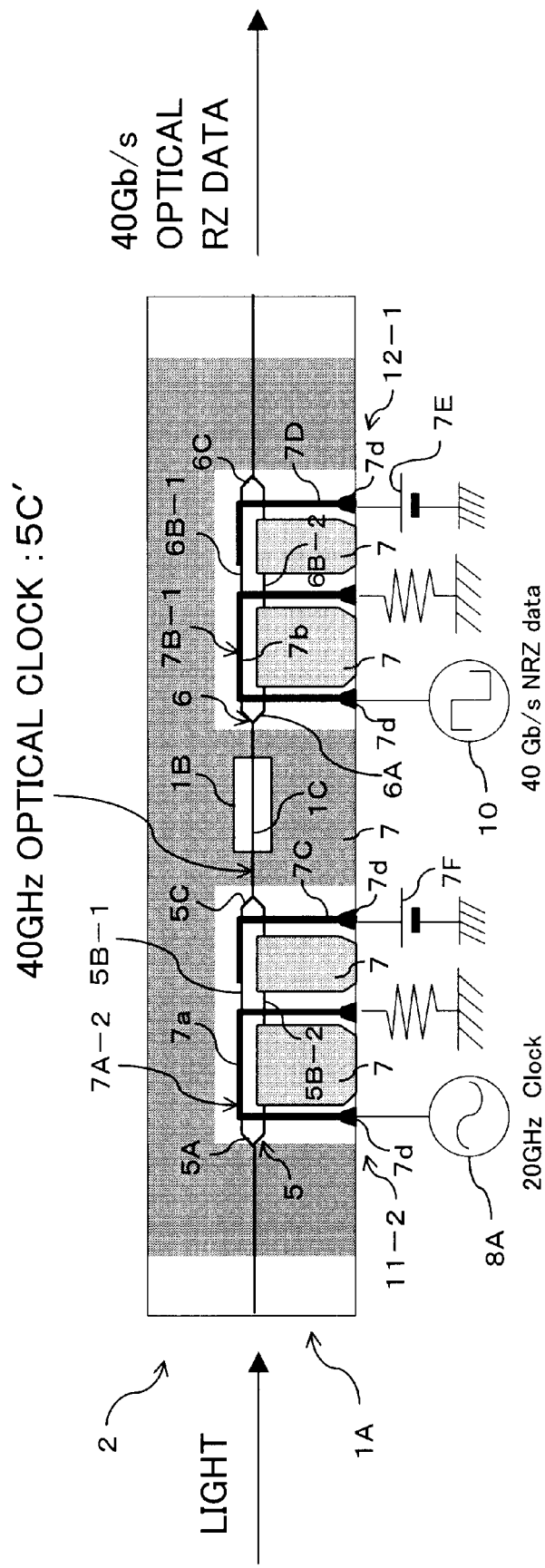
FIG. 20 is a schematic diagram showing an optical modulator of clock modulation type according to a second embodiment of the present invention.

FIG. 20 is a schematic diagram showing an optical modulator of clock modulation type according to a second embodiment of the present invention. An optical modulator 2 of clock modulation type shown in FIG. 20 is identical with that described in connection with the first embodiment in that two types of Mach-Zehnder optical waveguides are integrally formed in the substrate 1A which is formed from lithium niobate ($LiNbO_3$) and is cut along the Z-axis direction of crystal orientation thereof. However, there is a difference between them; that is, the configuration of a first Mach-Zehnder optical modulator 11-2.

In FIG. 20, elements which are substantially identical with those shown in FIG. 1 are assigned the same reference numerals. Specifically, a second Mach-Zehnder optical modulator 12-1 is constructed in the same manner as in the first embodiment.

In contrast with the first Mach-Zehnder optical modulator 11-1 employed in the first embodiment, the first Mach-Zehnder optical modulator 11-2 is further equipped with a first electrode 7A-2 and a bias electrode 7C.

More specifically, the first electrode 7A-2 is constructed of a single signal electrode 7a and a ground electrode 7. As in the case of the signal electrode 7b of the second Mach-Zehnder optical modulator 12-1, the signal electrode 7a is formed so as to establish continuity between two connector contact points provided on one longitudinal side edge of the substrate 1A. A portion of the signal electrode 7a overlaps the linear arm waveguide 5B-1 of the first optical waveguide 5.

In other words, the first electrode 7A-2 is formed as a single electrode having one signal electrode 7a, and the second electrode 7B-1 is formed as a single electrode having one signal electrode 7b.

The optical modulator 2 is provided with the single signal electrodes 7a and 7b, thereby obviating a necessity for a phase delay section (designated by 9A in FIG. 1) for applying a clock signal voltage to a dual electrode, which is required by the first electrode 7A-1 in the first embodiment. A voltage of $-V\pi$ to $+V\pi$ shown in FIG. 6(a) is applied to the signal electrode 7a. Alternatively, a voltage of $V\pi$ shown in FIG. 8(a) is applied to the signal electrode 7a as a modification analogous to the modulator 1-1 shown in FIG. 7.

As a single electrode, the bias electrode 7C applies to the first optical waveguide 5 a d.c. voltage output from a d.c. power source 7F. The bias electrode 7C is formed so as to overlap an upper portion of the linear arm waveguide 5B-1. As in the case of a bias electrode 7D of the second Mach-Zehnder optical modulator 12-1, the bias electrode 7C set forth is provided with an unillustrated connection pad.

In connection with the optical modulation of the optical modulator 2 according to the second embodiment, the second Mach-Zehnder optical modulator 12-1 is identical in optical modulation with that described in connection with the first embodiment. For this reason, the following description is provided while attention is paid to optical modulation of the first Mach-Zehnder optical modulator 11-2.

In a phase in which incident light originating from an unillustrated light source propagates through the first optical waveguide 5 constituting the first Mach-Zehnder optical modulator 11-2, a sinusoidal wave having a frequency of 20 GHz produced by the clock signal generation drive section 8A is applied to the first electrode 7A-2, whereby light is modulated into an optical RZ signal of 40 GHz.

By means of an electric signal applied to the single signal electrode 7a of the first electrode 7A-2, light propagating through the linear arm waveguides 5B-1 and 5B-2 constituting the first optical waveguide 5 is subjected to an electro-optical effect. As a result, an optical clock signal of 40 GHz is propagated through an output side of the Y-shaped branch waveguide 5C (see 5C' shown in FIG. 20).

The light signal which has been modulated into an optical clock signal by the first Mach-Zehnder optical modulator 11-2 is modulated into an optical RZ data signal of 40 Gb/s by the subsequent second Mach-Zehnder optical modulator 12-1, through use of the NRZ signal of 40 Gb/s produced by the NRZ data signal generator 10.

In the optical modulator 2 of clock modulation type according to the second embodiment, the first optical waveguide 5, the second optical waveguide 6, the first electrode 7A-2, and the second electrode 7B-1 are integrated in the substrate 1A. Further, the optical modulator 2 is provided with the clock signal generation drive section 8A and the NRZ data signal generator 10. Thus, a modulator for effecting encoding operation using an NRZ electric signal and a modulator for generating an RZ signal are integrated into a single chip. As a result, the space required by an optical modulator can be reduced while the tolerance of the optical modulator is improved. Thus, the optical modulator has advantageously lower construction costs.

Moreover, since the substrate 1A is cut along the Z-axis, matching can be readily achieved in connection with parameters to be used for evaluating performance when a high-speed optical modulator is constructed in connection with three parameters; namely, a drive voltage, a match between the speed of a light signal and the speed of an electric signal, an attenuation constant of an electric signal, and a characteristic impedance (usually 50 Ω).

(c) Description of a Third Embodiment

Figure 21:
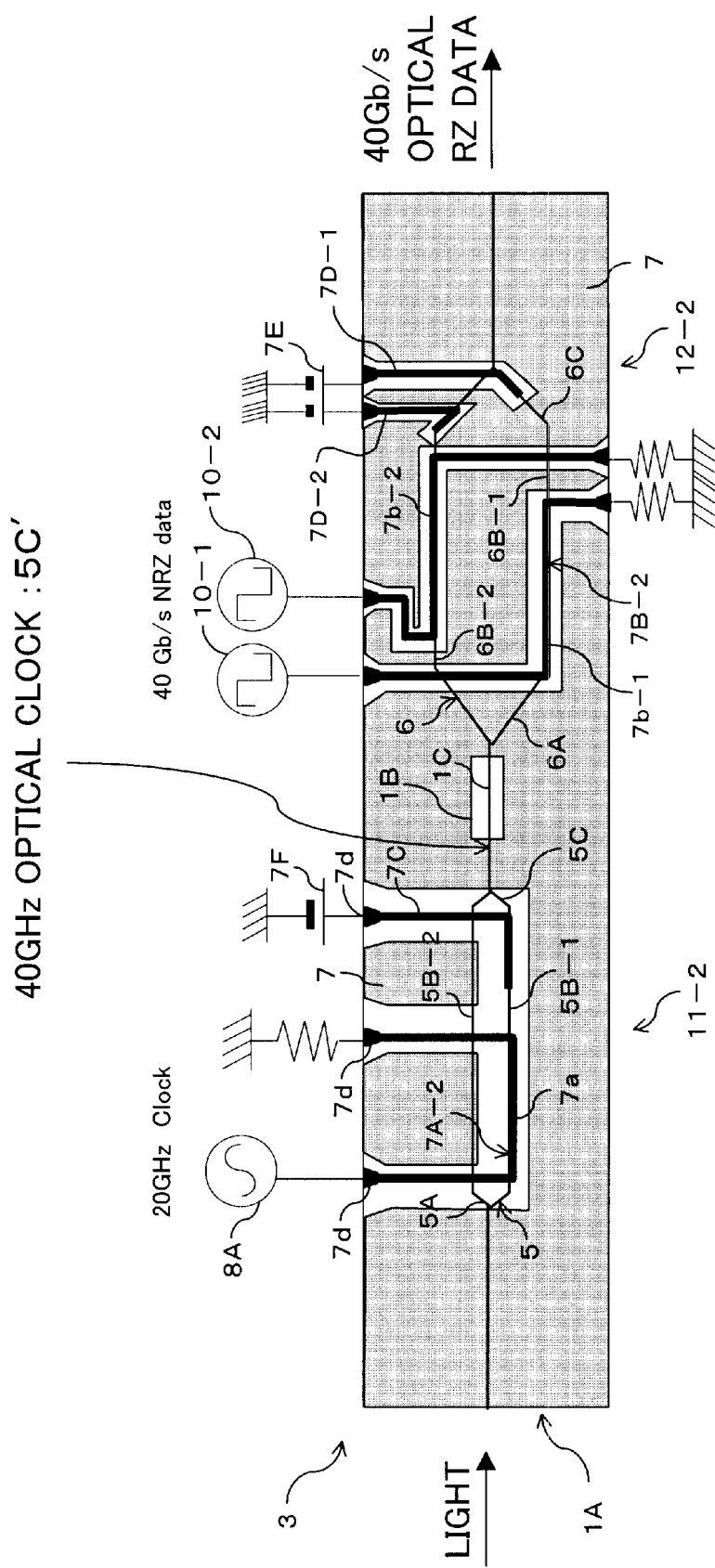
FIG. 21 is a schematic diagram showing an optical modulator of clock modulation type according to a third embodiment of the present invention.

FIG. 21 is a schematic diagram showing an optical modulator of clock modulation type according to a third embodiment of the present invention. An optical modulator 3 of clock modulation type shown in FIG. 21 is identical with that described in connection with the second embodiment in that two types of Mach-Zehnder optical waveguides are integrally formed in the substrate 1A which is formed from lithium niobate (LiNbO$_3$) and is cut along the Z-axis direction of crystal orientation thereof. However, there is a difference between them; that is, configuration of a second Mach-Zehnder optical modulator 12-2.

In FIG. 21, elements which are substantially identical with those shown in FIG. 20 are assigned the same reference numerals. Specifically, the first Mach-Zehnder optical modulator 11-2 is constructed in the same manner as in the second embodiment.

In contrast with the second Mach-Zehnder optical modulator 12-1 described in connection with the first and second embodiments, the second Mach-Zehnder optical modulator 12-2 is provided with a second electrode 7B-2 and bias electrodes 7D-1 and 7D-2. The substrate 1A and the second optical waveguide 6 employed in the third embodiment are the same as those described in the first and second embodiments.

The second electrode 7B-2 is formed on the substrate 1A for controlling light propagating through the second optical waveguide 6. The second electrode 7B-2 has a dual electrode consisting of the two signal electrodes 7b-1 and 7b-2, as well as the ground electrode 7.

The signal electrodes 7b-1 and 7b-2 of the second electrode 7B-2 are formed so as to establish continuity between two connector contact points provided on respective longitudinal side edges of the substrate 1A. The signal electrode 7b-1 is formed such that a portion of the signal electrode 7b-1 overlaps one linear arm waveguide 6B-1 of the second optical waveguide 6. Further, the signal electrode 7b-2 is formed such that a portion of the signal electrode 7b-2 overlaps the linear arm waveguide 6B-2 of the second optical waveguide 6.

Of the first and second electrode 7A-2 and the second electrode 7B-2, the second electrode 7B-2 is formed as a dual electrode having two signal electrodes. The first electrode 7A-2 is constituted as a single electrode having one signal electrode.

Reference numerals 10-1 and 10-2 designate NRZ data signal generators. The NRZ data signal generator 10-1 is connected to a signal electrode 7b-1 of the second electrode 7B-1, and the NRZ data signal generator 10-2 is connected to a signal electrode 7b-2 of the same. The NRZ data signal generators 10-1 and 10-2 are for supplying to the second electrode 7B-2 an NRZ data signal having a bit rate corresponding to an optical clock signal.

The NRZ data signal generators 10-1 and 10-2 are constructed so as to produce identical NRZ data signals which are 180° out of phase with each other. The NRZ data signal voltage output from the NRZ data signal generator 10-1 is applied to the signal electrode 7b-1. The NRZ data signal voltage output from the NRZ data signal generator 10-2 is applied to the signal electrode 7b-2.

In FIG. 21, the NRZ data signal generators 10-1 and 10-2 are illustrated as producing a data signal of 40 Gb/s.

In connection with the optical modulation of the optical modulator 3 according to the third embodiment, the first Mach-Zehnder optical modulator 11-2 is identical in optical modulation with that described in connection with the second embodiment. For this reason, the following description is provided while attention is paid to optical modulation of the second Mach-Zehnder optical modulator 12-2.

During a course in which the light signal that has been modulated into an optical clock signal by the first Mach-Zehnder optical modulator 11-2 propagates through the second optical waveguide 6 constituting the subsequent second Mach-Zehnder optical modulator 12-2, the light signal is modulated into an optical RZ data signal of 40 Gb/s through use of the NRZ signals of 40 Gb/s generated by the NRZ data signal generators 10-1 and 10-2.

The light propagating through the linear arm waveguides 6B-1 and 6B-2 constituting the first optical waveguide 6 are susceptible to an electro-optical effect exerted by means of the electric signals applied to the signal electrodes 7b-1 and 7b-2 of the second electrode 7B-2. The light signal that has been modulated to an optical RZ data signal of 40 GHz is propagated through an output side of the Y-shaped branch waveguide 6C.

The signal electrodes 7b-1 and 7b-2 constituting the second electrode 7B-2 are constructed so as to assume the form of a dual electrode. When the signal electrodes are constructed in the form of such a dual electrode, voltages applied to the respective signal electrodes; that is, drive voltages, can be made smaller than a drive voltage applied to a signal electrode consisting of a single electrode.

In the optical modulator 3 of clock modulation type according to the second embodiment, the first optical waveguide 5, the second optical waveguide 6, the first electrode 7A-2, and the second electrode 7B-2 are integrated on the substrate 1A. Further, the optical modulator 2 is provided with the clock signal generation drive section 8A and the NRZ data signal generators 10-1 and 10-2. Thus, a modulator for effecting encoding operation using an NRZ electric signal and a modulator for generating an RZ signal are integrated into a single chip. As a result, the space required by an optical modulator can be reduced while the tolerance of the optical modulator is improved. Thus, the optical modulator has advantageously lower construction costs.

Since the second electrode 7B-2 can be constructed as a dual electrode, drive voltages applied as voltage values to the respective electrodes can be reduced to a greater extent than the drive voltage applied to a signal electrode consisting of a single electrode. Accordingly, power consumption of and the field intensity applied to the entire optical modulator 3 can be diminished. Thus, the modulation efficiency of a light signal can be improved.

Moreover, since the substrate 1A is cut along the Z-axis, matching can be readily achieved in connection with parameters to be used for evaluating performance when a high-speed optical modulator is constructed in connection with four parameters; namely, a drive voltage, a match between the speed of a light signal and the speed of an electric signal, an attenuation constant of an electric signal, and a characteristic impedance (usually 50 Ω).

(d) Description of a Fourth Embodiment

Figure 22:
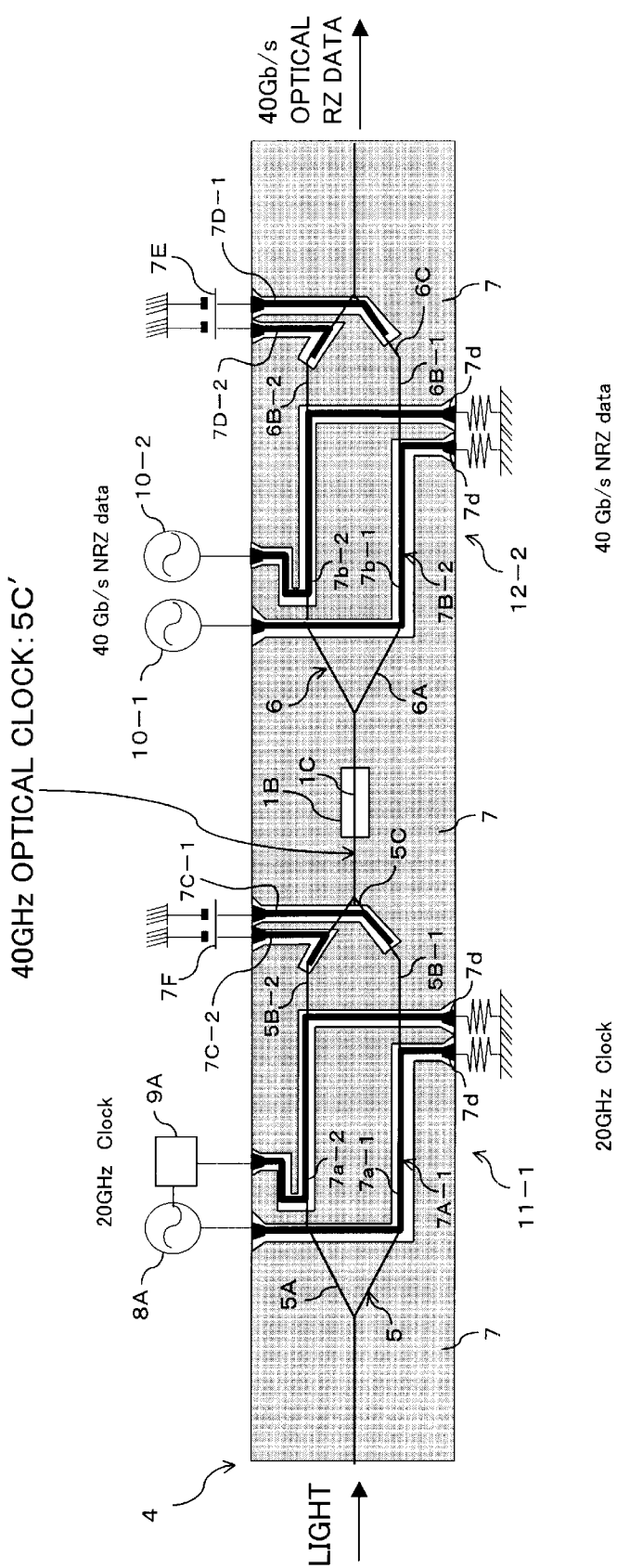
FIG. 22 is a schematic diagram showing an optical modulator of clock modulation type according to a fourth embodiment of the present invention.

FIG. 22 is a schematic diagram showing an optical modulator of clock modulation type according to a fourth embodiment of the present invention. An optical modulator 4 of clock modulation type shown in FIG. 22 is identical with that described in connection with the second embodiment in that two types of Mach-Zehnder optical waveguides are integrally formed in the substrate 1A which is formed from lithium niobate (LiNbO$_3$) and is cut along the Z-axis direction of crystal orientation thereof. The optical modulator 4 is provided with the optical modulator 11-1 identical with the first Mach-Zehnder optical modulator employed in the first embodiment and the optical modulator 12-2 identical with the second Mach-Zehnder optical modulator employed in the third embodiment.

In the optical modulator 4 of clock modulation type, the first electrode 7A-1 is formed from two signal electrodes 7a-1 and 7a-2, and the second signal electrode 7B-2 is formed from two signal electrodes 7b-1 and 7b-2.

In FIG. 22, elements which are substantially identical with those shown in FIGS. 1 and 21 are assigned the same reference numerals.

In connection with the optical modulation of the optical modulator 4 according to the fourth embodiment, the first Mach-Zehnder optical modulator 11-1 is identical in optical modulation with the first Mach-Zehnder optical modulator 11-1 described in connection with the first embodiment. The second Mach-Zehnder optical modulator 12-2 is identical in optical modulation with the second Mach-Zehnder optical modulator 12-2 described in connection with the third embodiment.

In the optical modulator 4 of clock modulation type according to the fourth embodiment, the first optical waveguide 5, the second optical waveguide 6, the first electrode 7A-1, and the second electrode 7B-2 are integrated in the substrate 1A. Further, the optical modulator 2 is provided with the clock signal generation drive section 8A and the NRZ data signal generators 10-1 and 10-2. Thus, a modulator for effecting encoding operation using an NRZ electric signal and a modulator for generating an RZ signal are integrated into a single chip. As a result, the space required by an optical modulator can be reduced while the tolerance of the optical modulator is improved. Thus, the optical modulator has advantageously lower construction costs.

Since the first electrode 7A-1 and the second electrode 7B-2 can be constructed as a dual electrode, drive voltages applied as voltage values to the respective electrodes can be reduced to a greater extent than the drive voltage applied to a signal electrode consisting of a single electrode. Accordingly, power consumption of and the field intensity applied to the entire optical modulator 4 can be diminished. Thus, the modulation efficiency of a light signal can be improved.

Moreover, since the substrate 1A is cut along the Z-axis, matching can be readily achieved in connection with parameters to be used for evaluating performance when a high-speed optical modulator is constructed in connection with four parameters; namely, a drive voltage, a match between the speed of a light signal and the speed of an electric signal, an attenuation constant of an electric signal, and a characteristic impedance (usually 50 Ω).

(e) Others

In the optical modulators 1, and 2 through 4 of clock modulation type described in connection with the previous embodiments, the transmission speed of output light per unit time is set to 40 Gb/s, and the frequency of a clock signal is set to 20 GHz. However, according to the present invention, the transmission speed of output light per unit time can be set to a value of 10 Gb/s or more, and the frequency of a clock signal can be set to a value of 5 GHz or more.

In the optical modulator 1-1 of clock modulation type according to a modification of the first embodiment, the transmission speed of output light per unit time is set to 40 Gb/s, and the frequency of a clock signal is set to 40 GHz. However, according to the present invention, the transmission speed of output light per unit time can be set to a value of 10 Gb/s or more, and the frequency of a clock signal can be set to a value of 10 GHz or more.

In the second through fourth embodiments, the light propagating through the first optical waveguide 5 is modulated into an optical clock signal of 40 GHz through use of a clock signal of 20 GHz produced by the clock signal generation drive section 8A. In addition, as in the case of the modification of the first embodiment (see FIG. 7), the optical modulator can be provided with the clock signal generation drive section 8B capable of producing a clock signal of 40 GHz, in place of the clock signal generation drive section 8A. Even in this case, the advantages yielded in the second through fourth embodiments are also yielded.

When the optical modulator 4 of clock modulation type according to the fourth embodiment is provided with the clock signal generation drive section 8B, the optical modulator 4 is provided with the phase delay section 9B identical with that provided in the optical modulator 1-1 shown in FIG. 7. When each of the optical modulators 2 and 3 according to the second and third embodiments is provided with the clock signal generation drive section 8B, a necessity for a phase delay section can be obviated.

In the optical modulators 3 and 4 according to the third and fourth embodiments, the NRZ data signal generators 10-1 and 10-2 are constructed so as to produce identical NRZ data signals which are 180° out of phase with each other. Alternatively, if the optical modulator is provided with the phase delay section 9B substantially identical with that shown in FIG. 7, an NRZ data signal generator may be constituted through use of only a single NRZ data signal generator 10.

In the optical modulators 1 through 4 and 1-1 described in connection with the previous embodiments, light is modulated into an optical clock signal during the course of propagating through the first optical waveguide 5. The optical clock signal is modulated into an optical RZ data signal during the course of propagating through the second optical waveguide 6, by applying an NRZ data signal voltage to the second electrodes 7B-1 and 7B-2. The optical clock signal may be modulated prior to modulation of an NRZ data signal. Needless to say, an optical modulator of such a configuration yields the same advantage as those yielded in the previous embodiments.

For example, the optical modulator 1 of clock modulation type according to the first embodiment may be constructed such that an NRZ data signal voltage output from the NRZ data signal generator 10-1 (see FIG. 21) is applied to the signal electrode 7a-1 of the first electrode 7A-1 and such that an NRZ data signal voltage output from the NRZ data signal generator 10-2 (see FIG. 21) is applied to the signal electrode 7a-2 of the same. Further, an RZ clock signal voltage output from the clock signal generation drive section 8A may be applied to the signal electrode 7b of the second electrode 7B-1. The same is also applied to the optical modulators 2 through 4 described in connection with the second through fourth embodiments.

In other words, each of the clock signal generation driver sections 8A, 9A, and 8B serving as clock signal generators may be connected to either the first electrodes 7A-1 and 7A-2 or the second electrode 7B-1 and 7B-2. A clock signal is applied to either the first electrodes 7A-1 and 7A-2 or the second electrodes 7B-1 and 7B-2, thereby producing an RZ signal. Each of the NRZ data signal generators 10, 10-1, and 10-2 is connected to the remaining pair from among the first electrodes 7A-1 and 7A-2 and the second electrodes 7B-1 and 7B-2. As a result, the NRZ data signal can be supplied to the remaining pair from among the first electrodes 7A-1 and 7A-2 and the second electrodes 7B-1 and 7B-2.

In the previous embodiments, the optical modules comprising the substrate 1A of lithium niobate (LiNbO$_3$) are described in detail. However, an optical modulator according to the present invention may be constituted through use of a substrate made of lithium tantalate or a lithium niobate crystal.

The substrate 1A used in the optical modulators 1, 1-1, and 2–4 shown in FIGS. 1, 7, and 20 through 22 is cut along the Z axis. However, the present invention is not limited to such a substrate and may employ a substrate cut along the X axis.

Each of the optical modulators 1, 1-1, and 2–4 of optical modulation type shown in FIGS. 1, 7, and 20 through 22 comprises the bias electrodes 7C-1, 7C-2, 7C, 7D, 7D-1, and 7D-2. However, the present invention is not limited to such a construction. So long as a bias voltage is superimposed on the signal electrodes 7a-1, 7a-2, 7a, 7b, 7b-1, and 7b-2 belonging to each of the optical modulators 1, 1-1, and 2 through 4, the bias electrodes 7C-1, 7C-2, 7C, 7D, 7D-1, and 7D-2 can be omitted.

Further, signal electrodes, bias electrodes, and ground electrodes of each of the optical modulators 1, 1-1, and 2 through 4 described in connection with the previous embodiments can be formed in the manner as shown in FIGS. 23(a) through 23(c).

FIGS. 23(a) through 23(c) show the relationships between the signal electrodes, the bias electrodes, and the ground (earth) electrodes, which are shown in FIGS. 1, 7, and 20 through 22. FIG. 23(a) is a schematic diagram for describing an electrode pattern provided on the substrate 1A when the lowermost electrode layer is viewed from above. FIG. 23(b) is a cross-sectional view of the electrode pattern taken along line "a." FIG. 23(c) is a cross-sectional view of the electrode pattern taken along line "b."

In connection with FIG. 23(a), the signal electrodes 7a-1, 7a-2, 7a, 7b, 7b-1, and 7b-2 and the bias electrodes 7C-1, 7C-2, 7C, 7D, 7D-1, and 7D-2, which are shown in FIGS. 1, 7, and 20 through 22, are generically called a signal line 41. Further, the optical waveguides 5 and 6 are generically designated by reference numeral 42. The optical waveguide 42, a buffer layer 1D, and a Si film 1E are omitted from FIGS. 23(b) and 23(c).

The signal line 41; that is, the signal electrodes and the bias electrode of each of the optical modulators 1, 1-1, and 2 through 4 described in connection with the embodiments, may be formed so as to have protuberances 43 extending in the longitudinal direction of the electrode. The protuberances 43 can prevent exfoliation of the signal line 41 having a width of 5 µm.

Further, a notch 44 is formed in an area where the protuberance 43 becomes close to the ground electrode 7, so as to correspond to the protuberance 43 such that a given distance can be maintained between the protuberances 43 and the ground electrode 7.

As shown in FIGS. 23(b) and 23(c), the signal line 41 and the ground electrode 7 are formed into a three-layer structure.

It goes without saying that the present invention can be implemented in various modifications within the scope of the invention, as well as in the form of the previous embodiments.

What is claimed is:

1. An optical modulator of clock modulation type comprising:
   a substrate possessing an electro-optical effect;
   a first optical waveguide of Mach-Zehnder type formed on the substrate;
   a second optical waveguide of Mach-Zehnder type formed on the substrate so as to be concatenated with the first optical waveguide of Mach-Zehnder type;
   a first electrode formed on the substrate for controlling light propagating through the first optical waveguide;
   a first bias electrode formed on the substrate for supplying a first bias voltage to the first optical waveguide;
   a second electrode formed on the substrate for controlling light propagating through the second optical waveguide;
   a second bias electrode formed on the substrate for supplying a second bias voltage to the second optical waveguide;
   the first optical waveguide, the second optical waveguide, the first electrode, the first bias electrode, the second electrode and the second bias electrode being integrated in the substrate;
   a clock signal generator which is connected to either the first or second electrode and produces an RZ signal by applying a clock signal to the same; and
   an NRZ data signal generator which is connected to the remaining electrode and supplies an NRZ data signal to the same.

2. The optical modulator of clock modulation type according to claim 1, wherein the first optical waveguide, the second optical waveguide, the first electrode, and the second electrode are integrated in the substrate in a single chip.

3. The optical modulator of clock modulation type according to claim 1, wherein each of the first and second electrodes is constituted of a signal electrode and a ground electrode, and the ground electrode is shared between the first and second electrodes.

4. The optical modulator of clock modulation type according to claim 1, wherein either the first or second electrode is constituted as a dual electrode having two signal electrodes, and the remaining electrode is constituted as a single electrode having one signal electrode.

5. The optical modulator of clock modulation type according to claim 1, wherein each of the first and second electrodes is constituted as a dual electrode having two signal electrodes.

6. The optical modulator of clock modulation type according to claim 1, wherein each of the first and second electrodes is constituted as a single electrode having one signal electrode.

7. The optical modulator of clock modulation type according to claim 1, wherein the clock signal generator is constituted so as to produce an RZ signal having a transmission speed equal to a per-unit-time transmission speed of light output from the optical modulator of clock modulation type, by applying, to either the first or second electrode, a clock signal having a frequency which corresponds to half the per-unit-time transmission speed of the light output from the optical modulator of clock modulation type.

8. The optical modulator of clock modulation type according to claim 7, wherein the per-unit-time transmission speed of the light output from the optical modulator of clock modulation type is 10 Gb/s or more, and the frequency of the clock signal is 5 GHz or more.

9. The optical modulator of clock modulation type according to claim 1, wherein the clock signal generator is constituted so as to produce an RZ signal having a transmission speed equal to a per-unit-time transmission speed of light output from the optical modulator of clock modulation type, by applying, to either the first or second electrode, a clock signal having a frequency corresponding to the per-unit-time transmission speed of the light output from the optical modulator of clock modulation type.

10. The optical modulator of clock modulation type according to claim 9, wherein the per-unit-time transmission speed of the light output from the optical modulator of clock modulation type is 10 Gb/s or more, and the frequency of the clock signal is 10 GHz or more.

11. The optical modulator of clock modulation type according to claim 1, wherein the substrate is formed from lithium niobate, lithium tantalate, or a lithium niobate crystal.

12. The optical modulator of clock modulation type according to claim 11, wherein the substrate is cut along a Z axis.

13. The optical modulator of clock modulation type according to claim 1, wherein light loss reduction means for reducing a loss arising in light propagating from the first optical waveguide to the second optical waveguide is provided in a junction between the first and second optical waveguides.

14. An optical modulator of clock modulation type comprising:
   a substrate formed from lithium niobate;
   a first optical waveguide of Mach-Zehnder type formed on the substrate;
   a second optical waveguide of Mach-Zehnder type formed on the substrate so as to be connected with the first optical waveguide of Mach-Zehnder type;
   a first electrode formed on the substrate for controlling light propagating through the first optical waveguide;
   a first bias electrode formed on the substrate for supplying a first bias voltage to the first optical waveguide;
   a second electrode formed on the substrate for controlling light propagating through the second optical waveguide;
   a second bias electrode formed on the substrate for supplying a second bias voltage to the second optical waveguide;
   the first optical waveguide, the second optical waveguide, the first electrode, the first bias electrode, the second electrode and the second bias electrode being integrated in the substrate;
   a clock signal generator which is connected to the first electrode and produces an RZ signal by applying a clock signal to either the first electrode; and
   an NRZ data signal generator which is connected to the second electrode and supplies an NRZ data signal to the second electrode.

15. The optical modulator of clock modulation type according to claim 14, wherein each of the first and second electrodes is constituted by a signal electrode and a ground electrode, and the ground electrode is shared between the first and second electrodes.

16. The optical modulator of clock modulation type according to claim 14, wherein either the first or second electrodes is constituted as a dual electrode having two signal electrodes, and the remaining one of the first and second electrodes is constituted as a single electrode having one signal electrode.

17. The optical modulator of clock modulation type according to claim 14, wherein each of the first and second electrodes is constituted as a dual electrode having two signal electrodes.

18. The optical modulator of clock modulation type according to claim 14, wherein each of the first and second electrodes is constituted as a single electrode having one signal electrode.

19. The optical modulator of clock modulation type according to claim 14, wherein the substrate is cut along a Z axis.

20. An optical modulator of clock modulation type comprising:
   a first Mach-Zehnder optical modulator including a substrate possessing an electro-optical effect, a first optical waveguide of Mach-Zehnder type formed on the substrate, a first electrode formed on the substrate for controlling light propagating through the first optical waveguide, and a first bias electrode formed on the substrate for supplying a first bias voltage to the first optical waveguide;
   a second Mach-Zehnder optical modulator which is concatenated and integrated with the first Mach-Zehnder optical modulator, including the substrate shared with the first Mach-Zehnder optical modulator, a second optical waveguide of Mach-Zehnder type formed on the substrate and connected to the first optical waveguide and a second electrode formed on the substrate for controlling light propagating through the second optical waveguide, and a second bias electrode formed on the substrate for supplying a second bias voltage to the second optical waveguide;
   a clock signal generator which is connected to either the first or second electrode and produces an RZ signal by applying a clock signal to the electrode to which the clock signal generator is connected; and
   an NRZ data signal generator which is connected to the remaining one of the first and second electrodes and supplies an NRZ data signal to the same.

21. An optical modulator of clock modulation type comprising:
   a substrate possessing an electro-optical effect;
   a first optical waveguide of Mach-Zehnder type formed on the substrate;
   a second optical waveguide of Mach-Zehnder type formed on the substrate so as to be concatenated with the first optical waveguide of Mach-Zehnder type;
   a first electrode formed on the substrate for controlling light propagating through the first optical waveguide;
   a second electrode formed on the substrate for controlling light propagating through the second optical waveguide;
   the first optical waveguide, the second optical waveguide, the first electrode, and the second electrode being integrated in the substrate;
   a clock signal generator which is connected to either the first or second electrode and produces an RZ signal by applying a clock signal to the same; and
   an NRZ data signal generator which is connected to the remaining electrode and supplies an NRZ data signal to the same, wherein the clock signal generator is constituted so as to produce an RZ signal having a transmission speed equal to a per-unit-time transmission speed of light output from the optical modulator of clock modulation type, by applying, to either the first or second electrode, a clock signal having a frequency which corresponds to half the per-unit-time transmission speed of the light output from the optical modulator of clock modulation type.

22. The optical modulator of clock modulation type according to claim 21, wherein the per-unit-time transmission speed of the light output from the optical modulator of clock modulation type is 10 Gb/s or more, and the frequency of the clock signal is 5 GHz or more.

23. An optical modulator of clock modulation type comprising:

a substrate possessing an electro-optical effect;

a first optical waveguide of Mach-Zehnder type formed on the substrate;

a second optical waveguide of Mach-Zehnder type formed on the substrate so as to be concatenated with the first optical waveguide of Mach-Zehnder type;

a first electrode formed on the substrate for controlling light propagating through the first optical waveguide;

a second electrode formed on the substrate for controlling light propagating through the second optical waveguide;

the first optical waveguide, the second optical waveguide, the first electrode, and the second electrode being integrated in the substrate;

a clock signal generator which is connected to either the first or second electrode and produces an RZ signal by applying a clock signal to the same; and an NRZ data signal generator which is connected to the remaining electrode and supplies an NRZ data signal to the same, wherein the clock signal generator is constituted so as to produce an RZ signal having a transmission speed equal to a per-unit-time transmission speed of light output from the optical modulator of clock modulation type, by applying, to either the first or second electrode, a clock signal having a frequency corresponding to the per-unit-time transmission speed of the light output from the optical modulator of clock modulation type.

24. The optical modulator of clock modulation type according to claim 23, wherein the per-unit-time transmission speed of the light output from the optical modulator of clock modulation type is 10 Gb/s or more, and the frequency of the clock signal is 10 GHz or more.

* * * * *